United States Patent
Yamakado et al.

(10) Patent No.: US 10,384,673 B2
(45) Date of Patent: Aug. 20, 2019

(54) METHOD AND DEVICE FOR CONTROLLING VEHICLE MOTION AND VEHICLE EQUIPPED WITH SAME

(71) Applicant: Hitachi Automotive Systems, Ltd., Hitachinaka-shi, Ibaraki (JP)

(72) Inventors: Makoto Yamakado, Tokyo (JP); Toshiyuki Innami, Hitachinaka (JP); Keiichiro Nagatsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 211 days.

(21) Appl. No.: 15/510,110

(22) PCT Filed: Jul. 27, 2015

(86) PCT No.: PCT/JP2015/071180
§ 371 (c)(1),
(2) Date: Mar. 9, 2017

(87) PCT Pub. No.: WO2016/051942
PCT Pub. Date: Apr. 7, 2016

(65) Prior Publication Data
US 2017/0305416 A1  Oct. 26, 2017

(30) Foreign Application Priority Data
Sep. 29, 2014 (JP) .................................. 2014-197752

(51) Int. Cl.
*B60W 30/045* (2012.01)
*B60W 10/192* (2012.01)
(Continued)

(52) U.S. Cl.
CPC ............. *B60W 30/045* (2013.01); *B60T 7/12* (2013.01); *B60T 8/1755* (2013.01);
(Continued)

(58) Field of Classification Search
CPC ......... B60W 30/045; B60W 30/18109; B60W 10/16; B60W 10/192; B60W 40/109;
(Continued)

(56) References Cited

U.S. PATENT DOCUMENTS

| | | | |
|---|---|---|---|
| 4,807,901 A * | 2/1989 | Kondo | ................... B60G 3/205 280/124.144 |
| 4,896,738 A | 1/1990 | Kodama | |

(Continued)

FOREIGN PATENT DOCUMENTS

| | | |
|---|---|---|
| DE | 37 20 459 A1 | 12/1987 |
| DE | 44 00 704 A1 | 7/1994 |

(Continued)

OTHER PUBLICATIONS

International Search Report (PCT/ISA/210) issued in PCT Application No. PCT/JP2015/071180 dated Nov. 17, 2015 with English translation (Four (4) pages).

(Continued)

*Primary Examiner* — Frederick M Brushaber
(74) *Attorney, Agent, or Firm* — Crowell & Moring LLP

(57) ABSTRACT

The purpose of the present invention is to provide a device and method for controlling vehicle motion and a vehicle equipped with the device, such that driving force and/or braking force is properly distributed between front wheels and rear wheels so that steering characteristics are made suitable and controllability and stability improve. This device comprises a means for controlling braking and/or driving force distribution between the front wheels and rear wheels of a vehicle such that when the absolute value of lateral acceleration of the vehicle increases, the distribution to the front wheels is made smaller, and when the absolute value of lateral acceleration of the vehicle decreases, the distribution to the front wheels is made larger.

28 Claims, 10 Drawing Sheets

(51) Int. Cl.
| | |
|---|---|
| *B60W 10/16* | (2012.01) |
| *B60T 8/1766* | (2006.01) |
| *B60W 30/18* | (2012.01) |
| *B60W 40/114* | (2012.01) |
| *B60T 8/1755* | (2006.01) |
| *B60T 7/12* | (2006.01) |
| *B60T 8/24* | (2006.01) |
| *B60W 40/109* | (2012.01) |

(52) U.S. Cl.
CPC .............. *B60T 8/1766* (2013.01); *B60T 8/24* (2013.01); *B60W 10/16* (2013.01); *B60W 10/192* (2013.01); *B60W 30/18109* (2013.01); *B60W 40/109* (2013.01); *B60W 40/114* (2013.01); *B60T 2201/16* (2013.01); *B60T 2270/303* (2013.01); *B60T 2270/608* (2013.01); *B60W 2520/10* (2013.01); *B60W 2520/14* (2013.01); *B60W 2720/406* (2013.01)

(58) Field of Classification Search
CPC ........... B60W 40/114; B60W 2520/10; B60W 2720/406; B60W 2520/14; B60T 8/1766; B60T 8/24; B60T 7/12; B60T 8/1755; B60T 2270/608; B60T 2270/303; B60T 2201/16
See application file for complete search history.

(56) References Cited

U.S. PATENT DOCUMENTS

| | | | |
|---|---|---|---|
| 5,474,369 A | 12/1995 | Inagaki et al. | |
| 5,826,209 A * | 10/1998 | Matsuno | B60K 23/0808 701/69 |
| 5,928,302 A * | 7/1999 | Fukada | B60T 8/1755 701/70 |
| 6,094,614 A * | 7/2000 | Hiwatashi | B60K 23/0808 180/197 |
| 6,745,112 B2 * | 6/2004 | Mori | B60G 17/019 180/197 |
| 8,983,748 B2 * | 3/2015 | Takahashi | B60T 8/1755 701/70 |
| 2001/0007965 A1 * | 7/2001 | Yokoyama | B60T 8/1755 701/70 |
| 2002/0109402 A1 * | 8/2002 | Nakamura | B60T 8/17552 303/146 |
| 2003/0218378 A1 * | 11/2003 | Tanaka | B60T 8/1755 303/146 |
| 2004/0227399 A1 | 11/2004 | Sasaki | |
| 2004/0267429 A1 * | 12/2004 | Matsuno | B60T 8/1755 701/80 |
| 2005/0217921 A1 | 10/2005 | Mori et al. | |
| 2006/0006615 A1 * | 1/2006 | Mizuta | B60G 17/0162 280/5.508 |
| 2006/0015236 A1 * | 1/2006 | Yamaguchi | B60K 17/356 701/69 |
| 2006/0030974 A1 * | 2/2006 | Tsukasaki | B60K 23/04 701/1 |
| 2006/0086556 A1 * | 4/2006 | Matsuno | B60K 23/0808 180/245 |
| 2009/0120707 A1 * | 5/2009 | Yoneda | B60K 23/0808 180/248 |
| 2009/0171526 A1 * | 7/2009 | Takenaka | B60T 8/17552 701/70 |
| 2010/0114449 A1 * | 5/2010 | Shiozawa | B60L 3/10 701/90 |
| 2010/0250083 A1 | 9/2010 | Takahashi et al. | |
| 2011/0218700 A1 * | 9/2011 | Mori | B60W 10/06 701/31.4 |
| 2012/0049617 A1 * | 3/2012 | Furuyama | B60T 8/1766 303/9.75 |
| 2012/0209489 A1 | 8/2012 | Saito et al. | |
| 2012/0323445 A1 | 12/2012 | Yamakado et al. | |
| 2016/0059852 A1 * | 3/2016 | Yamakado | B60W 40/107 701/41 |

FOREIGN PATENT DOCUMENTS

| | | |
|---|---|---|
| EP | 0 189 176 A2 | 7/1986 |
| EP | 1 561 629 A2 | 8/2005 |
| EP | 2 484 572 A1 | 8/2012 |
| EP | 2 492 160 A1 | 8/2012 |
| EP | 2 623 386 A1 | 8/2013 |
| JP | 6-80035 A | 3/1994 |
| JP | 2004-338506 A | 12/2004 |
| JP | 2005-349887 A | 12/2005 |
| JP | 2008-285066 A | 11/2008 |
| JP | 2010-228690 A | 10/2010 |
| JP | 2011-88576 A | 5/2011 |
| JP | 2013-67382 A | 4/2013 |

OTHER PUBLICATIONS

Japanese-language Written Opinion (PCT/ISA/237) issued in PCT Application No. PCT/JP2015/071180 dated Nov. 17, 2015 with English translation (Eight (8) pages).

Yamakado, M., et al., "Improvement in Vehicle Agility and Stability by G-Vectoring Control", Vehicle System Dynamics, vol. 48, Supplement, 2010, Taylor & Francis, pp. 231-254 (Twenty-four (24) pages).

European Search Report issued in counterpart European Application No. 15847292.8 dated May 4, 2018 (nine (9) pages).

* cited by examiner

| Symbol | Definition | Value | Symbol | Definition | Value |
|---|---|---|---|---|---|
| $m$ | Vehicle Mass | 1503 kg | $h$ | Height of C.G | 0.531 m |
| $l_f$ | C.G to front axle | 1.036 m | $V_0$ | Initial Speed | 50km/h |
| $l_r$ | C.G to rear axle | 1.630 m | $\delta_{max}$ | Max δ angle | 35deg |
| $d$ | Wheel Tread | 1.482 m | $C_{xy}$ | GVC gain | 0.35 |
| $T$ | GVC delay time | 0.05 s | $C_{dg}$ | Distribution gain | 1.0 |

(1) LOW-SPEED TRAVELING CONDITION (SMALL JERK)

(2) HIGH-SPEED TRAVELING CONDITION (LARGE JERK)

METHOD AND DEVICE FOR CONTROLLING VEHICLE MOTION AND VEHICLE EQUIPPED WITH SAME

TECHNICAL FIELD

The present invention relates to a method and device for controlling a vehicle motion which control a distribution ratio of driving force, braking force or both of driving force and braking force of a vehicle to front and rear wheels, and a vehicle equipped with the same.

BACKGROUND ART

An electric vehicle (EV) of a mass production first generation is equipped with a motor as an alternative of an internal combustion engine, and a single motor is provided for a vehicle. In a future EV/hybrid electric vehicle (HEV) with a higher price range, it is considered that vehicles equipped with a plurality of motors increase to make a difference.

Front and rear twin motor-mounted vehicles having a front wheel motor and a rear wheel motor have a four-wheel drive system in view of the configuration, and the starting and acceleration performances are improved. Since the kinetic energy during deceleration can be regenerated by the front and rear wheels even during turning, it is easy to increase the amount of regeneration. Particularly, by distributing the regenerative torque depending on the load, it is possible to maximize the amount of regeneration (it is possible to perform deceleration/regeneration in a stable posture like the front and rear distribution of brake torque).

In contrast, in the left-right twin motor arrangement, at the time of turning, kinetic energy is regenerated in the inner wheel to obtain the deceleration force and electric energy, and acceleration force is obtained by operating the outer wheel using this energy, thereby performing a direct yaw-moment control (DYC). However, since the turning speed of the inner wheel is lower than that of the outer wheel, the inner wheel can generate power only at a lower voltage than the counter electromotive voltage of the outer wheel side. Therefore, although the regenerative power generation is possible in the inner wheel, substantially, electric energy is taken out of the battery and is supplied to the outer wheel side, and the whole vehicle can hardly regenerate the kinetic energy at the time of turning.

Also, although the front and rear twin motor-mounted vehicles are driven by all wheels, in the case of the left and right twin motor arrangement, another motor is required for driving all the wheels, which leads to increases in cost and weight. In this way, the merit of the right and left twin motor arrangement is the elimination of the differential gear and the possibility of DYC. However, in DYC, a roll moment is generated from an imbalance between the left and right link half forces generated by the braking force/driving force, and in many cases, natural coupling of the yaw motion and the roll motion is often impaired.

Based on the aforementioned background, it is desirable to obtain turning performance equal to or higher than that of the left and right twin motor-mounted vehicles by finding the front-rear distribution control contents that improve the turning performance (maneuverability and stability) of the front and rear twin motor-mounted vehicles. Further, a method of dynamically controlling the front-rear distribution ratio is also applicable to vehicles having the front-rear distribution function among conventional four-wheel drive vehicles that achieve four-wheel drive with one prime mover as well as the EV/HEV.

In order to solve this problem, for example, PTL 1 discloses a technique of a driving force distribution total control system of front-rear wheels and left-right wheels which includes a front and rear wheel driving force distribution control system which controls distribution of driving force to front and rear wheels according to a predetermined vehicle state, a left and right wheel driving force distribution control system which controls the driving force distribution to left and right wheels according to a predetermined vehicle state, an oversteering moment detecting means for detecting the time when an oversteering moment occurs or is predicted to occur by control on the left and right wheel driving force distribution control system side at the time of turning, and a first total control means for performing a correction control in which a front wheel distribution amount corresponding to the amount of oversteering moment detection is added at the time of detection of an oversteering moment on the front and rear wheel driving force distribution control system side. Further, PTL 1 discloses a technique of a driving force distribution total control device of front-rear wheels and left-right wheels which includes an understeering moment detecting means for detecting the time when an understeering moment occurs or is predicted to occur by the control of the front and rear wheel driving force distribution control system side at the time of turning, and a second total control means for performing a correction control in which the turning outer wheel distribution amount corresponding to the amount of understeering moment detection is added at the time of detection of the understeering moment on the left-right wheel driving force distribution system side.

Further, PTL 2 discloses a motion control method of a vehicle in which an input lateral jerk (Gy_dot) of a vehicle is multiplied by a prestored gain (KGyV) determined from speed (V) and lateral acceleration (Gy), a control command for controlling the longitudinal acceleration of the vehicle is generated on the basis of the multiplied value, and the generated control command is output. According to this method, as mentioned in NPL 1, a trajectory of the combined acceleration vector (G) of the longitudinal acceleration and the lateral acceleration is directed so as to draw a smooth curve (Vectoring) in the coordinate system with the fixed vehicle center of gravity, which is referred to as a G-Vectoring Control (GVC).

CITATION LIST

Patent Literature

PTL 1: Japanese Patent Application Laid-Open No. 6-80035
PTL 2: Japanese Patent Application Laid-Open No. 2008-285066

Non-Patent Literature

NPL 1: Improvement in vehicle agility and stability by G-Vectoring control M. Yamakado, J. Takahashi, S. Saito, A. Yokoyama & M. Abe, Vehicle System Dynamics, Volume 48, Supplement 1, December 2010, pages 231-254
NPL 2: M. Abe, Vehicle Handling Dynamics, Butterworth-Heinemman, Oxford, 2009.

SUMMARY OF INVENTION

Technical Problem

According to PTL 1, since the oversteering moment is likely to occur when the lateral acceleration is large and the differential limiting torque is large, or when the lateral acceleration is large and the increase change of the differential limiting torque is large, the differential limiting torque sensitive gain Kgd is given as a high value according to the ease of oversteering moment. However, in such a method, a sign of oversteering caused by the operation itself of the system is indicated, and it is not clarified why oversteering is likely to occur. As a result, there is a need for running-→tuning in each state of the vehicle, and it cannot be said that a general design method is established. Therefore, when a system is configured with this technique, there is a concern that the system becomes a high-cost system.

Further, in PTL 1, for example, at the time of turning on a low μ road surface or the like, when the understeering moment occurs or is predicted to occur by the control for increasing the driving force distribution to the front wheel side on the front and rear wheel driving force distribution control system side at the time of turning, the understeering moment state is detected by the understeering moment detecting means. Further, when the understeering moment is detected, in the second total control means, the correction control in which the turning outer wheel distribution amount corresponding to the amount of understeering moment detection is added is performed on the left-right wheel driving force distribution control system side. That is, in the understeer control, a driving force distribution control device for the left and right wheels is required, and in the front and rear twin motor-mounted vehicle, attempts are being made by performing DYC which cannot be achieved.

Further, in the GVC of PTL 2, by controlling the longitudinal acceleration in association with the lateral motion of the vehicle, the load movement caused by the acceleration and deceleration suitably acts on the steering characteristic, and even if the DYC is not performed, it has been proved that the maneuverability and stability can be improved. However, PTL 2 does not disclose how to distribute the driving force/braking force for achieving the acceleration and deceleration command value to the front wheels and the rear wheels.

An object of the present invention is to provide a method and device for controlling motion of a vehicle which make steering characteristics preferable and perform a front and rear driving distribution control (Distribution plus, referred to as D+), which improves both maneuverability and stability, by appropriately distributing the driving force/braking force to the front wheels and the rear wheels, and a vehicle equipped with the same.

Solution to Problem

In order to achieve the aforementioned object, the vehicle motion control device and the vehicle equipped with the same according to the present invention have means for controlling the braking/driving distribution of the front wheels and the rear wheels of the vehicle, and when the absolute value of the lateral acceleration of the vehicle increases, the distribution to the front wheels is decreased, and when the absolute value of the lateral acceleration of the vehicle decreases, the distribution to the front wheels is increased.

Advantageous Effects of Invention

A front and rear driving distribution control (D+) for improving both of maneuverability and stability of the vehicle is embodied, and thus it is possible to provide a vehicle motion control device and a vehicle equipped with the same (a transfer type four wheel drive, and a front and rear twin motor-mounted vehicle). Further, considering only the braking side, it is also applicable to a brake device capable of changing the front-rear distribution and a vehicle on which the brake device is mounted.

DESCRIPTION OF EMBODIMENTS

Figure 1:
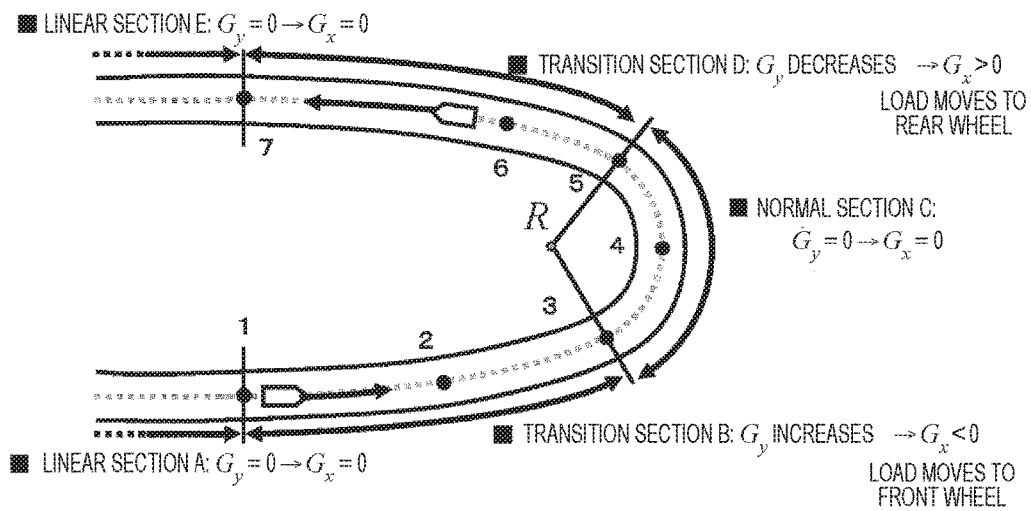
FIG. 1 is a diagram illustrating a state from a left corner entry to escape of a GVC vehicle used in the present invention.
Figure 1:
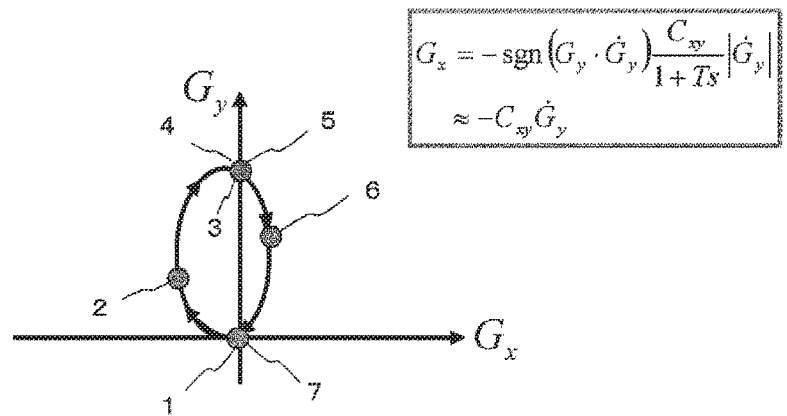

First, a basic idea of a means for solving the problem will be described and its configuration and embodiment will be illustrated.

The present invention relates to a technique of how to distribute driving force/braking force forward and backward. As a matter of course, the driving force/braking force are generated with generation of the acceleration and deceleration, but there is no particular limitation on what acceleration and deceleration portion is. For example, a driver may distribute the driving force/braking force forward and backward according to the accelerator/brake operation arbitrarily performed during the cornering, or the driving force/braking force may be distributed forward and backward on the basis of the control command of the acceleration and deceleration from the controller based on the G-Vectoring control in NPL 1. Here, a case of distributing the driving force/braking force forward and backward for achieving acceleration and deceleration determined based on the G-Vectoring control (hereinafter, referred to as GVC) capable of reproducing the lateral motion-related motion of the skilled driver will be considered.

Hereinafter, first, an outline of GVC will be described. Next, a basic idea concerning the tire characteristics of a vehicle will be discussed based on NPL 2. Here, 1) nonlinear characteristics for a side slip angle of the tire cornering force, 2) load dependency, and 3) driving force/braking force dependency will be discussed, and means for solving the problem in the present invention will be derived. Finally, its configuration and embodiment will be illustrated.

<Longitudinal Acceleration Control Associated with Lateral Motion (G-Vectoring)>

NPL 1 discloses a method for improving the maneuverability and stability of a vehicle by generating a load movement between the front wheels and the rear wheels by automatically accelerating and decelerating the vehicle in association with the lateral motion caused by the steering wheel operation. A specific acceleration and deceleration command value (target longitudinal acceleration Gxc) is shown in the following formula 1,

[Formula 1]

$$G_{xc} = -\mathrm{sgn}(G_y \cdot \dot{G}_y)\frac{C_{xy}}{1+Ts}|\dot{G}_y| + G_{x\_DC} \qquad (1)$$

$$※ \dot{G}_y = \mathrm{Gy\_dot}$$

Basically, it is a simple control rule in which the lateral jerk Gy_dot is multiplied by the gain Cxy and the value obtained by giving the first-order delay is set as the longitudinal acceleration and deceleration command.

Further, Gy is a lateral acceleration of the vehicle, Gy_dot is a lateral jerk of the vehicle, Cxy is a gain, T is a first-order delay time constant, s is a Laplace operator, and Gx_DC is an acceleration and deceleration command which is not associated to the lateral motion, for example, one corresponding to pre-crash brake described later.

As a result, it is confirmed in NPL 1 that a part of the linkage control strategy of the expert driver sideways and the longitudinal motion can be simulated, and improvement in maneuverability and stability of the vehicle can be achieved.

Gx_DC in this formula is a deceleration component (offset) that is not associated to lateral motion. This is a term required when predictive deceleration in a case where there is a corner ahead or there is a section speed command. Also, the sgn (Signum) term is a term provided so that the above operation can be obtained for both of the right corner and the left corner. Specifically, deceleration is performed when turning on the steering start, and the deceleration is stopped when the vehicle turns steady (because the lateral jerk becomes zero), and an operation of acceleration at the time of escaping the corner at the start of steering return can be achieved.

When controlled in this way, the combined acceleration (denoted by G) of the longitudinal acceleration and the lateral acceleration is a diagram in which the longitudinal acceleration of the vehicle is taken on the horizontal axis and the lateral acceleration of the vehicle is taken on the vertical axis, and it is directed to make a curved transition (Vectoring) with an elapse of time. Thus, it is called a "G-Vectoring control".

Description will be made assuming a specific running with respect to the vehicle motion when the control of the formula 1 is applied.

FIG. 1 assumes a general running scene of entering and exiting a corner, such as a straight section A, a transition section B, a steady turning section C, a transition section D, and a straight section E. At this time, it is assumed that the acceleration and deceleration operation of the driver is not performed.

Figure 2:
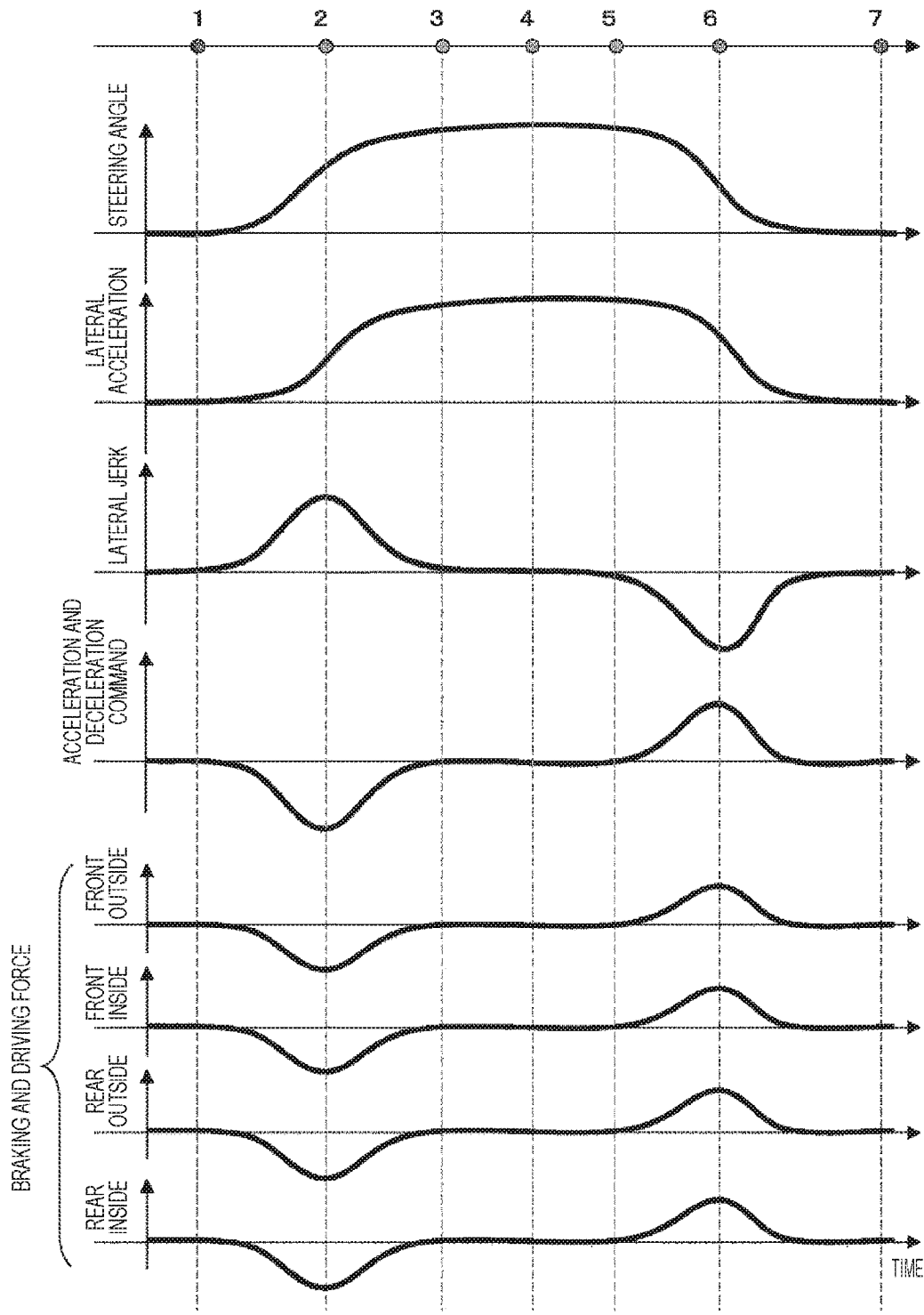
FIG. 2 is a diagram illustrating time-series data in the case of traveling as illustrated in FIG. 1.

FIG. 2 is a diagram illustrating the steering angle, the lateral acceleration, the lateral jerk, the acceleration and deceleration command calculated by the formula 1, and the braking and driving force of the four wheels as time calendar waveforms. As it will be described in detail later, the braking force/driving force are distributed so that the front outer wheel and the front inner wheel, and the rear outer wheel and the rear inner wheel have the same value for the left and right (inside and outside), respectively. Here, the braking force/driving force are a generic term of forces generated in the vehicle longitudinal direction of each wheel, the braking force is defined as a force in a direction of decelerating the vehicle, and the driving force is defined as a force in a direction of accelerating the vehicle. First, the vehicle enters the corner from the straight section A. In the transition section B (points 1 to 3), the lateral acceleration Gy of the vehicle increases as the driver gradually increases the steering. The lateral jerk Gy_dot takes a positive value, while the lateral acceleration in the vicinity of the point 2 is increasing (returning to zero at the time point 3 at which the lateral acceleration increase ends). At this time, from the formula 1, the deceleration (Gxc is negative) command is issued to the controlled vehicle with an increase in the lateral acceleration Gy. Along with this, braking forces (minus signs) of approximately the same magnitude are applied to each of wheels of the front outside, the front inside, the rear outside, and the rear inside.

Thereafter, when the vehicle enters the steady turning section C (point 3 to point 5), the driver stops increasing of steering and keeps the steering angle constant. At this time, since the lateral jerk Gy_dot becomes zero, the acceleration and deceleration command Gxc becomes zero. Therefore, the braking force/driving force of each wheel also become 0.

Next, in the transition section D (points 5 to 7), the lateral acceleration Gy of the vehicle decreases due to the turning back operation of the driver's steering. At this time, the lateral jerk Gy_dot of the vehicle is negative, and from the formula 1, the acceleration command Gxc is generated in the controlled vehicle. Along with this, substantially the same driving force (plus sign) is applied to each wheel of front outside, the front inside, the rear outside and the rear inside.

In the straight section E, since the lateral jerk Gy becomes zero and the lateral jerk Gy_dot also becomes zero, the acceleration and deceleration control are not performed. In this way, the deceleration is performed from the turning-in time point (point 1) to the clipping point (point 3) of the steering start, the deceleration is stopped during steady circle turning (point 3 to point 5), and acceleration is performed from the steering turning back start (point 5) to the corner escape (point 7). In this way, if the G-Vectoring control is applied to the vehicle, the driver can achieve the acceleration and deceleration motions associated to the lateral motion, only by performing steering for turning.

Further, when this motion is expressed in a "g-g" diagram illustrating an acceleration mode occurring in the vehicle with the longitudinal acceleration as a horizontal axis and the lateral acceleration as a vertical axis, a characteristic motion that transitions to a smooth curved shape (to draw a circle) is obtained. In the diagram, the acceleration and deceleration commands of the present invention are generated so as to make a curved transition with the elapse of time. For the left corner, this curved transition is a clockwise transition as illustrated in FIG. 1, and for the right corner, it is a transition path reversed about the Gx axis, and its transition direction is counterclockwise. When this transition occurs, the pitching motion generated in the vehicle due to the longitudinal acceleration and the roll motion generated by the lateral acceleration preferably associate with each other, and the peak values of the roll rate and the pitch rate are reduced.

In this control, as illustrated in FIG. 1, considering by omitting the first-order delay term and the sign function for the left and right motions, the value obtained by multiplying the lateral jerk of the vehicle by the gain-Cxy is used as the longitudinal acceleration command. Thus, by increasing the gain, it is possible to increase deceleration or acceleration for the same lateral jerk.

Hereinafter, by reviewing the dynamic characteristics of the cornering force of the tire based on the application of the GVC, the derivation of the front and rear distribution guidelines of the braking force/driving force targeted in the present invention will be advanced.

<Consideration on Steering Characteristics of Vehicle>

The above-mentioned GVC is a basic control guideline for linking the forward and backward motion in accordance with the lateral motion, but when a longitudinal motion occurs, a load movement occurs between the front and rear wheels. Also, in order to generate the forward and backward motion, it is necessary to generate the braking force/driving force. These phenomena are the gains that generate the lateral forces of the front and rear wheels and change the cornering stiffness that governs the steering characteristics of the vehicle. As a result, the forward and backward motion of the GVC will also affect the lateral motion. In this chapter, we will focus on the influence on the lateral motion, especially the steering characteristics, and prepare for the derivation of the longitudinal force (torque) distribution that makes the steering characteristics suitable.

(1) Steering Characteristics of Vehicle

The concept of understeer (U.S.), oversteer (O.S.) and neutral steer (N.S.) is a very important concept in discussing the motion characteristics of the vehicle. If the side slip angle occurs at the center of gravity point for some cause under the condition that the steering angle of the vehicle is zero, the same side slip angle β also occurs in the front and rear wheels, and the lateral force is generated. This lateral force becomes a moment around the center of gravity point, and the yawing motion is well known.

[Formula 2]

$$I\frac{dr}{dt} + \frac{2(l_f^2 K_f + l_r^2 K_r)}{V} r = -2(l_f K_f - l_r K_r)\beta \quad (2)$$

Here, I is a yawing moment of inertia of the vehicle, r is a yaw rate, $l_f$ is a distance between the center of gravity of the vehicle and the front axle, $l_r$ is a distance between center of gravity of the vehicle and the front axle, $K_f$ is cornering stiffness of the front wheel, $K_r$ is cornering stiffness of the rear wheel, V is a vehicle speed, and β is a side slip angle.

If β is positive, the following yawing moment acts on the center of gravity point of the vehicle by this formula.

1) When $l_f K_f - l_r K_r$ is positive, β is negative.
2) When $l_f K_f - l_r K_r$ is zero, β is zero.
3) When $l_f K_f - l_r K_r$ is negative, β is positive.

In the case of 1), the force application point of the resultant force of the lateral forces generated in the front and rear wheels depending on the side slip angle is ahead of the center of gravity point of the vehicle, in the case of 2), it coincides with the center of gravity point, and in the case of 3), the force application point is behind the center of gravity point of the vehicle. The force application point of the resultant force of the front and rear wheel cornering forces is called a neutral-steer-point (NSP).

Figure 3:
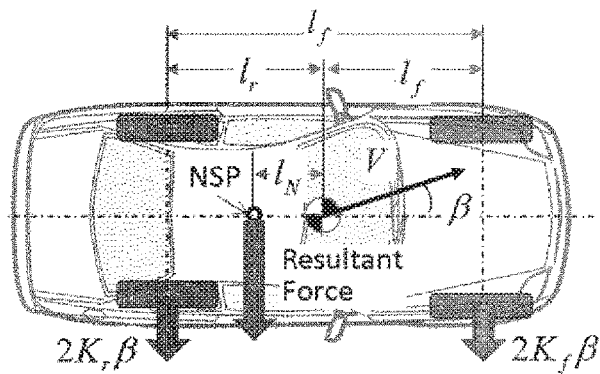
FIG. 3 is a diagram illustrating a force application point of a tire lateral force generated by a side slip of a vehicle center of gravity point.

Assuming that the center of gravity point of the vehicle causes the side slip angle β, the lateral forces acting on the front and rear wheels are $2K_f\beta$ and $2K_r\beta$. As illustrated in FIG. 3, if the distance between NSP and the center of gravity point of the vehicle is set as $l_n$, the moments due to $2K_f\beta$ and $2K_r\beta$ around NSP needs to be balanced.

[Formula 3]

$$(l_f + l_{Nr}) \cdot 2K_f\beta - (l_r - l_{Nr}) \cdot 2K_r\beta = 0 \quad (3)$$

From this formula, the following formula is obtained.

[Formula 4]

$$l_N = -\frac{l_f K_f - l_r K_r}{K_f + K_r} \quad (4)$$

That is, NSP is ahead of the center of gravity point in the case of 1), is behind the center of gravity point in the case of 3), and matches the center of gravity point in the case of 2). Then, the value obtained by dividing $l_N$ by the wheel base l to be dimensionless is called a static margin (hereinafter referred to as S.M.) and is well known as an index for quantitatively expressing the steering characteristic.

[Formula 5]

$$S.M. = \frac{l_N}{l} = -\frac{l_f K_f - l_r K_r}{l(K_f + K_r)} \quad (5)$$

The steering characteristic of the vehicle can be defined as follows using S. M.

1) S.M.>0→U.S.
2) S.M.=0→N.S.
3) S.M.<0→O.S.

Most of the production vehicles are designed to be S.M.>0 of 1). For example, when the vehicle 1 is S.M.1, the vehicle 2 is S.M.2 and S.M.1>S.M.2, both of the vehicle 1 and the vehicle 2 are still in the U.S., but it is possible to consider that U.S. is weaker in the vehicle 2 than the vehicle 1.

Furthermore, as can be seen from the formula (5), when the cornering stiffnesses $K_f$, $K_r$ of the front wheels and the rear wheels change under the influences of cornering force nonlinearity, vertical load to tire or braking force/driving force, SM changes. In considering the instantaneous S.M. (hereinafter referred to as I.S.M) as will be discussed in the next section, there is a strong moment or a moment when the U.S. becomes weaker according to the various conditions in a single vehicle, it is possible to consider a method of controlling the vertical load on the tire by acceleration or deceleration or appropriately controlling the I.S.M. by controlling the front-rear distribution ratio of the braking force/driving force in association with the lateral motion.

Figure 4:
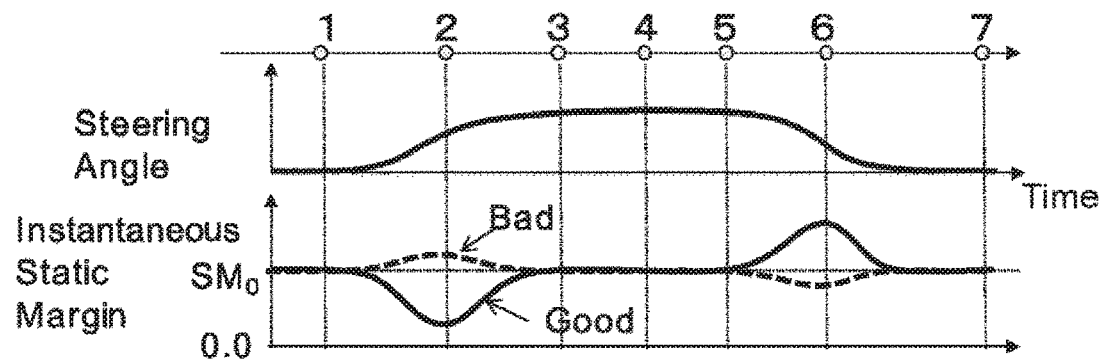
FIG. 4 is a diagram illustrating an instantaneous static margin of a vehicle.
Figure 5:
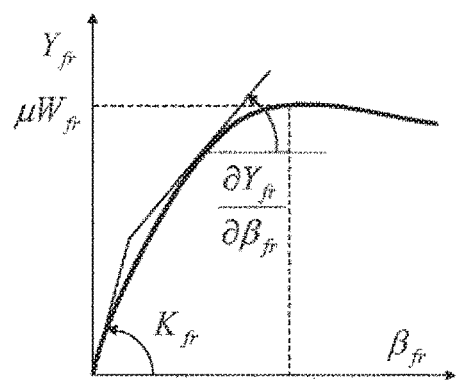
FIG. 5 is a diagram illustrating approximation of nonlinear characteristics of tire characteristics.

As illustrated in FIG. 4, in a situation where a driver starts steering (1 to 3 in FIG. 4, the same as in FIG. 1), by making the U.S. relatively weak, maneuverability is improved and the necessary steering angle decreases. In contrast, when returning to the linear state by returning the steering (5 to 7), the stability improves if the U.S. becomes relatively strong. From the driver's point of view, it can be felt as "car with high handling performance". In contrast, if U.S. becomes stronger at the time of entering a corner and U. S. becomes weaker at the time of exiting the corner, it will be evaluated as "the understeer is strong and the stability is bad". In the following sections below, factors which influence on I.S.M., the side slip angle, the load, and the control and drive distribution will be sequentially illustrated.

(2) Influence of Nonlinearity of Tire Characteristics

So far, S. M. has been considered on the premise that the lateral force acting on the tire is proportional to its side slip angle. Here, we will consider that when the side slip angle of the tire increases and the lateral force does not necessarily become proportional to the side slip angle, how it affects S.M.

As a relation between the lateral force Y of the tire and the side slip angle β, for the sake of simplicity, it is assumed here that the cornering stiffness at the side slip angle 0 is $K_0$ and the lateral force is saturated at the frictional force μW (W: tire vertical load), when this is approximated by a quadratic formula of side slip angle, the following formula is obtained.

[Formula 6]

$$Y_{fr} = K_{fr0}\beta_{fr} - \frac{K_{fr0}^2}{4\mu W_{fr}}\beta_{fr}^2 \quad (6)$$

Here, if the equivalent cornering stiffness at the side slip angle β is formally calculated by partial differentiation of the formula (6) with β,

[Formula 7]

$$K_{fre} = \frac{\partial Y_{fr}}{\partial \beta_{fr}} = K_{fr0} - \frac{K_{fr0}^2}{2\mu W_{fr}}\beta_{fr} == K_{fr0}\left(1 - \frac{K_{fr0}}{2\mu W_{fr}}\beta_{fr}\right) \quad (7)$$

For example, when considering the front wheel 1, since $W_f = l_r \cdot mg/l/2$,

[Formula 8]

$$K_{fe} = \frac{\partial Y_f}{\partial \beta_f} = K_{f0}\left(1 - \frac{K_{f0}}{\mu \frac{l_r mg}{l}}\beta_f\right) \quad (8)$$

Now, assuming that the vehicle of the yawing inertial moment I of the mass m is turned at the lateral acceleration and yaw rate r of $G_y$, if only that magnitude of the lateral forces acting on the front and rear wheels is considered,

[Formula 9]

$$2Y_f(\beta_f) = \frac{l_r}{l}mG_y + \frac{1}{l}I\dot{r} = 2\left(K_{f0}\beta_f - \frac{K_{f0}^2}{4\mu\frac{l_r mg}{2l}}\beta_f^2\right) \quad (9)$$

When substituting the approximate formula $I \approx m \cdot l_f \cdot l_r$, for it, and dividing both sides by $\mu l_r \cdot mg/l$,

[Formula 10]

$$\frac{1}{\mu g}(G_y + l_f\dot{r}) = \quad (10)$$

$$2\frac{K_{f0}}{\mu\frac{l_r mg}{l}}\beta_f - \frac{K_{f0}^2}{\mu\frac{l_r mg}{l}\mu\frac{l_r mg}{l}}\beta_f^2 = 2\frac{K_{f0}}{\mu\frac{l_r mg}{l}}\beta_f = \left(\frac{K_{f0}}{\mu\frac{l_r mg}{l}}\beta_f\right)^2$$

Here, when the formula (10) is subtracted from 1 so that factorization can be performed,

[Formula 11]

$$1 - \frac{1}{\mu g}(G_y + l_f\dot{r}) = \quad (11)$$

$$1 - 2\frac{K_{f0}}{\mu\frac{l_r mg}{l}}\beta_f + \left(\frac{K_{f0}}{\mu\frac{l_r mg}{l}}\beta_f\right)^2 = \left(1 - \frac{K_{f0}}{\mu\frac{l_r mg}{l}}\beta_f\right)^2$$

Therefore, when taking the square root of the formula (10) and multiplying by $K_{f0}$,

[Formula 12]

$$K_{f0}\sqrt{1 - \frac{1}{\mu g}(G_y + l_f\dot{r})} = K_{f0}\left(1 - \frac{K_{f0}}{\mu\frac{l_r mg}{l}}\beta_f\right) = \frac{\partial Y_f}{\partial \beta_f} \quad (12)$$

In the case of $(G_y + l_f \dot{r})/\mu g \ll 1$, it can be opened.

[Formula 13]

$$\frac{\partial Y_f}{\partial \beta_f} \approx K_{f0}\left(1 - \frac{1}{2}\frac{1}{\mu g}(G_y + l_f\dot{r})\right) \quad (13)$$

Similarly, for the rear wheels,

[Formula 14]

$$\frac{\partial Y_r}{\partial \beta_r} \approx K_{r0}\left(1 - \frac{1}{2}\frac{1}{\mu g}(G_y + l_r\dot{r})\right) \quad (14)$$

Therefore, the instantaneous static margin I.S.M.$_{NL}$ considering the influence of nonlinearity of tire characteristics,

[Formula 15]

$$I.S.M._{NL} = -\frac{l_f \frac{\partial Y_f}{\partial \beta_f} - l_r \frac{\partial Y_r}{\partial \beta_r}}{l\left(\frac{\partial Y_f}{\partial \beta_f} + l_r \frac{\partial Y_r}{\partial \beta_r}\right)} \quad (15)$$

$$= -\frac{1}{l} \frac{l_f K_{f0}\left(1 - \frac{1}{2\mu g}(G_y + l_f \dot{r})\right) - l_r K_{r0}\left(1 - \frac{1}{2\mu g}(G_y + l_r \dot{r})\right)}{K_{f0}\left(1 - \frac{1}{2\mu g}(G_y + l_f \dot{r})\right) + K_{r0}\left(1 - \frac{1}{2\mu g}(G_y + l_r \dot{r})\right)}$$

$$= -\frac{1}{l} \frac{(l_f K_{f0} - l_r K_{r0})\left(1 - \frac{G_y}{2\mu g}\right) - \frac{\dot{r}}{2\mu g}(l_f^2 K_{f0} + l_r^2 K_{r0})}{(K_{f0} - K_{r0})\left(1 - \frac{G_y}{2\mu g}\right) + \frac{\dot{r}}{2\mu g}(l_f K_{f0} - l_r K_{r0})}$$

$$= -\frac{1}{l} \frac{(l_f K_{f0} - l_r K_{r0})(2\mu g - G_y) - (l_f^2 K_{f0} + l_r^2 K_{r0})\dot{r}}{(K_{f0} + K_{r0})(2\mu g - G_y) + (l_f K_{f0} - l_r K_{r0})\dot{r}}$$

$$= \frac{1}{l} \frac{(l_f K_{f0} - l_r K_{r0})\left\{(2\mu g - G_y) - \frac{(l_f^2 K_f - l_r^2 K_r)}{(l_f K_f - l_r K_r)}\dot{r}\right\}}{(K_{f0} + K_{r0})\left\{(2\mu g - G_y) + \frac{(l_f K_{f0} - l_r K_{r0})}{(K_{f0} + K_{r0})}\dot{r}\right\}}$$

$$= S.M._0 \frac{\left\{(2\mu g - G_y) - \frac{(l_f^2 K_{f0} + l_r^2 K_{r0})}{(l_f K_{f0} - l_r K_{r0})}\dot{r}\right\}}{\{(2\mu g - G_y) - I.S.M._0 \dot{r}\}}$$

Here, the situation at the beginning of steering-off for vehicles of U.S. (S.M.$_0$>0, −($l_f K_{f0}−l_r K_{r0}$)>0) is considered. That is, initial turning in which the absolute value of the lateral acceleration $G_y$ is small ($G_y \approx 0$) and an increase in yaw rate is large will be considered.

[Formula 16]

[Formula 16]

$$I.S.M._{NL} \approx S.M._0 \frac{\left\{2\mu g - \frac{(l_f^2 K_{f0} + l_r^2 K_{r0})}{(l_f K_{f0} - l_r K_{r0})}\dot{r}\right\}}{\{2\mu g - I.S.M._0 \dot{r}\}} = S.M._0 \frac{\{2\mu g + D\dot{r}\}}{\{2\mu g - C\dot{r}\}} \quad (16)$$

(C, D: Const > 0)

Since the instantaneous static margin I.S.M.$_{NL}$ may be obtained by subtracting the product of positive constant C>0, D>0 and yaw angular acceleration ($\dot{r}$>0) from the denominator and by adding it to the numerator, when the yaw angular acceleration increases, it shows that the U.S. becomes stronger. In contrast, when returning from turning to straight motion, the yaw angular acceleration becomes negative, the denominator is large, the numerator is small, and the U.S. is relatively weak. Therefore, although there is a difference in degree, the influence of the nonlinearity of the tire characteristic, when the U.S. becomes stronger at the time of entering the corner and when the U.S. becomes relatively weaker at the time of exiting the corner, can be the root cause of unfavorable characteristics, as it is said that "the understeer is strong and the stability is bad", as illustrated above. Also, assuming that the side slip angular velocity is very small,

[Formula 17]

$$G_y = V(\dot{\beta}+r) \approx V \cdot r \quad (17)$$

And assuming that the speed change is also small for a sufficiently short period of time,

[Formula 18]

$$\dot{G}_y \approx V \cdot \dot{r} \rightarrow \dot{r} = \frac{\dot{G}_y}{V} = C^* \dot{G}_y \quad C^* = \text{pseudo } Const \quad (18)$$

It is possible to consider that the yaw angular acceleration information includes lateral jerk information.

Therefore, in order not to increase the yaw angular acceleration (lateral jerk), specifically, it is important to operate so as not to increase the steering speed. In contrast, if the yaw angular acceleration (lateral jerk) becomes zero, that is, when the lateral acceleration stabilizes as a steady turn, it should be noted that there is feature that the instantaneous static margin I.S.M.$_{NL}$ returns to the original S.M.$_0$.

(3) Influence of Load Dependence by Acceleration and Deceleration

In the previous section, it was found that the tire having nonlinear characteristics with respect to the side slip angle includes a mechanism which is difficult to steer unless a control is applied. In this section, in order to consider the mechanism which alleviates this characteristic by performing the acceleration and deceleration, first, the load dependence of the cornering force will be reviewed.

When acceleration and deceleration is performed, the vertical load of the tire moves. For example, the load is moved from the rear wheel to the front wheel during deceleration and is moved from the front wheel to the rear wheel during acceleration. On the other hand, the cornering force has a load dependency as well known. Here, assuming that the cornering stiffness is $K_{iw}$ (i=f, r, f: front, r: rear) and these have first-order load dependency (proportional coefficient $C_l$) with respect to the tire vertical load $W_i$,

[Formula 19]

$$K_w = C_1 W_i \quad (19)$$

On the other hand, when the vehicle accelerates or decelerates with $G_x$, assuming that the height of the center of gravity of the vehicle is h, the front wheel load (one piece) is as follows:

[Formula 20]

$$W_f = \frac{m l_r g}{2l}\left(1 - \frac{h}{l_r g} G_x\right) \quad (20)$$

The rear wheel load (one piece) is as follows:

[Formula 21]

$$W_r = \frac{m l_f g}{2l}\left(1 + \frac{h}{l_f g} G_x\right) \quad (21)$$

Therefore, cornering stiffness of each of front and rear wheels is as follows:

[Formula 22]

$$K_{fw} = C_1 W_f = C_1 \frac{ml_r g}{2l}\left(1 - \frac{h}{l_r g} G_x\right) = K_{f0}\left(1 - \frac{h}{l_r g} G_x\right) \quad (22)$$

[Formula 23]

$$K_{rw} = C_1 W_r = C_1 \frac{ml_f g}{2l}\left(1 + \frac{h}{l_f g} G_x\right) = K_{r0}\left(1 + \frac{h}{l_f g} G_x\right) \quad (23)$$

Therefore, the instantaneous static margin I.S.M.$_{Gx}$ during motion with acceleration and deceleration Gx is as follows:

[Formula 24]

$$\begin{aligned} I.S.M._{G_x} &= -\frac{l_f K_{fw} - l_r K_{rw}}{l(K_{fw} + K_{rw})} \quad (24) \\ &= \frac{1}{l}\frac{l_f K_{f0}\left(1 - \frac{h}{l_r g}G_x\right) - l_r K_{r0}\left(1 + \frac{h}{l_f g}G_x\right)}{K_{f0}\left(1 - \frac{h}{l_r g}G_x\right) + K_{r0}\left(1 + \frac{h}{l_f g}G_x\right)} \\ &= \frac{1}{l}\frac{(l_f K_{f0} - l_r K_{r0}) - \frac{h}{g}G_x\left(\frac{l_f K_{f0}}{l_r} + \frac{l_r K_{r0}}{l_f}\right)}{(K_{f0} + K_{r0}) - \frac{h}{g}G_x\left(\frac{1}{l_r} - \frac{1}{l_f}\right)} \\ &= -\frac{1}{l}\frac{(l_f K_{f0} - l_r K_{r0}) - \frac{h}{g}\left(\frac{l_f^2 K_{f0} + l_r^2 K_{r0}}{l_f l_r}\right)G_x}{(K_{f0} + K_{r0}) - \frac{h}{g}\left(\frac{l_f - l_r}{l_f l_r}\right)G_x} \end{aligned}$$

Here, in order to directly and easily view the influence of acceleration and deceleration, when simplified as $l_f = l_r$, the following formula is obtained:

[Formula 25]

$$\begin{aligned} I.S.M._{G_x} &= -\frac{1}{l}\frac{(l_f K_{f0} - l_r K_{r0}) - \frac{h}{g}\left(\frac{l_f^2 K_{f0} + l_r^2 K_{r0}}{l_f l_r}\right)G_x}{(K_{f0} + K_{r0})} \quad (25) \\ &= -\frac{1}{l}\frac{(l_f K_{f0} - l_r K_{r0})}{(K_{f0} + K_{r0})} + \frac{h}{l}\frac{(l_f^2 K_{f0} + l_r^2 K_{r0})}{gl_f l_r(K_{f0} + K_{r0})}G_x \\ &= S.M._0 + \frac{h}{l}\frac{(l_f^2 K_{f0} + l_r^2 K_{r0})}{gl_f l_r(K_{f0} + K_{r0})}G_x \\ &= S.M._0 + K \cdot G_x \left(K = \frac{h}{l}\frac{(l_f^2 K_{f0} + l_r^2 K_{r0})}{gl_f l_r(K_{f0} + K_{r0})} > 0\right) \end{aligned}$$

The formula (25) indicates that, when the vehicle accelerates ($G_x > 0$), the static margin increases, the U.S. becomes stronger, and conversely when the vehicle decelerates ($G_x < 0$), the static margin decreases and the U.S. becomes weaker. The GVC weakens the U.S. by decelerating at the beginning of the turn where the lateral acceleration increases, and enhances the U.S. and improves the stability by accelerating at the end of the turn such that the lateral acceleration drops back to the linear state. That is, there is a function of compensating for deterioration of maneuverability and stability caused by the tire nonlinear characteristics mentioned in the previous section.

Figure 6:
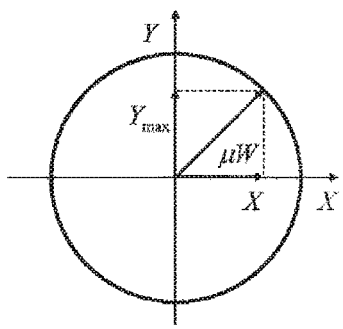
FIG. 6 is a diagram illustrating a tire friction circle.

(4) In the sections before the influence of longitudinal force dependence which achieves the acceleration and deceleration, we discussed the change in steering characteristics caused by the load movement due to acceleration and deceleration. On the other hand, in order to accelerate and decelerate the vehicle, it is necessary to generate the longitudinal force with four wheel tires. This force influences the cornering force of the tire. According to the classical Coulomb friction law, as illustrated in FIG. 6, the cornering force Y generated by the tire and the driving force (or the braking force) X need to satisfy the following formula in any case.

[Formula 26]

$$\sqrt{Y^2 + X^2} \leq \mu W \quad (26)$$

In other words, the resultant force of the forces of every direction in the horizontal plane acting between the tire and the ground cannot exceed the value obtained by multiplying the vertical load by the coefficient of friction at that time, and the resultant force vector remains within the circle of radius μW. This circle is called a friction circle. If driving force or braking force of X acts in the longitudinal direction of the tire, the maximum cornering force $Y_{max}$ that reaches with a large side slip angle is expressed by the following formula (here, for simplicity, only the longitudinal force dependence that realizes longitudinal force dependence acceleration and deceleration that achieves the acceleration and deceleration is focused, and the load movement due to acceleration and deceleration will not be considered).

[Formula 27]

$$Y_{max} = \sqrt{\mu^2 W^2 - X^2} \quad (27)$$

Assuming that there is a same rate of decrease in cornering force due to driving force (or braking force) at any side slip angle with respect to the relation of the cornering force $Y_0$ with respect to the side slip angle when the driving force or the braking force is zero, the following formula holds.

[Formula 28]

$$Y = Y_0 \sqrt{1 - \left(\frac{X}{\mu W}\right)^2} \approx F_0\left(1 - \frac{1}{2}\left(\frac{X}{\mu W}\right)^2\right) \quad (28)$$

Based on this relation, we will study how to distribute the driving force (or braking force) which achieves acceleration and deceleration in the previous section forward and backward.

First, considering the vertical loads ($W_f$, $W_r$) of the front and rear wheels of a vehicle which accelerates and decelerates with the longitudinal acceleration $G_x$, the following formula is obtained:

[Formula 29]

$$W_f = \frac{ml_r g}{2l}\left(1 - \frac{h}{l_r g}G_x\right), W_r = \frac{ml_f g}{2l}\left(1 + \frac{h}{l_f g}G_x\right) \quad (29)$$

Here, the distribution concept of load proportion of driving force or braking force will be introduced. The ratio of the braking force/driving force to be distributed to the front wheels and the braking force/driving force to be distributed to the rear wheels is set as α:(1−α) (0<α<1).

[Formula 30]

$$\alpha = \frac{W_f}{W_f + W_r} = \frac{W_f}{\frac{mg}{2}} = \frac{l_r}{l}\left(1 - \frac{h}{l_r g}G_x\right), \quad (30)$$

$$(1-\alpha) = \frac{l_f + l_r}{l} - \left(\frac{l_r}{l} - \frac{h}{gl}G_x\right) = \frac{l_f}{l}\left(1 + \frac{h}{l_f g}G_x\right)$$

If the driving force or the braking force $(X_f, X_r)$ of the front and rear wheels for achieving the longitudinal acceleration $G_x$ is distributed according to this ratio, the following formula is obtained:

[Formula 31]

$$X_f = \alpha \frac{1}{2}mG_x = \frac{l_r}{2l}\left(1 - \frac{h}{l_r g}G_x\right)mG_x, \quad (31)$$

$$X_r = (1-\alpha)\frac{1}{2}mG_x = \frac{l_f}{2l}\left(1 + \frac{h}{l_f g}G_x\right)mG_x$$

When considering substitution of this to the formula (26) and calculating $X/\mu W$ for each of front and rear wheels, the following formula is obtained:
[Formula 32]

[Formula 32]

$$\frac{X_f}{\mu W_f} = \frac{\frac{l_r}{2l}\left(1 - \frac{h}{l_r g}G_x\right)mG_x}{\mu \frac{ml_r g}{2l}\left(1 - \frac{h}{l_r g}G_x\right)} = \frac{G_x}{\mu g} \quad (32)$$

$$\frac{X_y}{\mu W_r} = \frac{\frac{l_f}{2l}\left(1 + \frac{h}{l_f g}G_x\right)mG_x}{\mu \frac{ml_f g}{2l}\left(1 + \frac{h}{l_f g}G_x\right)} = \frac{G_x}{\mu g}$$

As a result, the cornering forces of the front wheel and the rear wheel decrease at the same rate.

[Formula 33]

$$Y_f = Y_{f0}\sqrt{1 - \left(\frac{G_x}{\mu g}\right)^2} \approx Y_{f0}\left(1 - \frac{1}{2}\left(\frac{G_x}{\mu g}\right)^2\right), \quad (33)$$

$$Y_r = Y_{r0}\sqrt{1 - \left(\frac{G_x}{\mu g}\right)^2} \approx Y_{r0}\left(1 - \frac{1}{2}\left(\frac{G_x}{\mu g}\right)^2\right)$$

If both are partially differentiated with the side slip angles $\beta_f$ and $\beta_r$ of the front wheels to obtain equivalent cornering stiffness, the following formula is obtained:

[Formula 34]

$$\frac{\partial Y_f}{\partial \beta_f} = \frac{\partial Y_{f0}}{\partial \beta_f}\left(1 - \frac{1}{2}\left(\frac{G_x}{\mu g}\right)^2\right), \quad (34)$$

$$\frac{\partial Y_r}{\partial \beta_f} = \frac{\partial Y_{r0}}{\partial \beta_f}\left(1 - \frac{1}{2}\left(\frac{G_x}{\mu g}\right)^2\right)$$

Therefore, the instantaneous static margin I.S.M.$_{LD}$ is as follows:

[Formula 35]

$$I.S.M._{LD} = \frac{1}{l}\frac{l_f\frac{\partial Y_f}{\partial \beta_f} - l_r\frac{\partial Y_r}{\partial \beta_f}}{\frac{\partial Y_f}{\partial \beta_f} + \frac{\partial Y_r}{\partial \beta_f}} \quad (35)$$

$$= -\frac{1}{l}\frac{l_f\frac{\partial Y_{f0}}{\partial \beta_f}\left(1 - \frac{1}{2}\left(\frac{G_x}{\mu g}\right)^2\right) - l_r\frac{\partial Y_{r0}}{\partial \beta_f}\left(1 - \frac{1}{2}\left(\frac{G_x}{\mu g}\right)^2\right)}{\frac{\partial Y_{f0}}{\partial \beta_f}\left(1 - \frac{1}{2}\left(\frac{G_x}{\mu g}\right)^2\right) + \frac{\partial Y_{r0}}{\partial \beta_f}\left(1 - \frac{1}{2}\left(\frac{G_x}{\mu g}\right)^2\right)}$$

$$= -\frac{1}{l}\frac{l_f\frac{\partial Y_{f0}}{\partial \beta_f} - l_r\frac{\partial Y_{r0}}{\partial \beta_f}}{\frac{\partial Y_{f0}}{\partial \beta_f} + \frac{\partial Y_{r0}}{\partial \beta_f}}$$

$$= I.S.M._0$$

If the driving force or the braking force is distributed in proportion to the loads of the front and rear wheels as illustrated in the formula (35), the acceleration and deceleration can be performed without changing the steering characteristics due to the driving force or the braking force. Generally, the front-rear distribution of the braking force due to the brake is designed to be almost a load proportion. Therefore, when achieving GVC by the brake control, it is possible to obtain only the effect of improving the steering characteristics using load transfer by deceleration described in the previous section.

In this chapter, the influence of 1) nonlinearity of the tire cornering force, 2) load dependency, 3) braking force or driving force was evaluated by the instantaneous static margin (I.S.M.). This enables to confirm inclusion of the mechanism of deterioration of maneuverability and stability caused by yaw angular acceleration (jerk) at the start of steering provided due to 1), 2) formation of compensation mechanism for maneuverability and stability by suitable load movement due to GVC, and 3) there is no influence of distribution of the braking force or the driving force with the longitudinal load ratio on the steering characteristic. In the next chapter, we will study the dynamic distribution control (Distribution plus, D+) of driving force or braking force with the aim of further improving the steering characteristics.

<Front and Rear Wheel Distribution Control (D+)>

In this chapter, we derive the longitudinal force (torque) distribution that makes the steering characteristic suitable. First, from the distribution of front and rear load ratio in the previous chapter, the following distribution offset $d_p$ is added to the front wheels and subtracted from the rear wheels.

[Formula 36]

$$X_{Df} = \alpha(1 + d_p)\frac{1}{2}mG_x = \frac{l_r}{2l}\left(1 - \frac{h}{l_r g}G_x\right)(1 + d_p)mG_x \quad (36)$$

$$X_{Dr} = \{1 - \alpha(1 + d_p)\}\frac{1}{2}mG_x = \frac{l_f}{2l}\left(1 - \frac{h}{l_f g}G_x\right)(1 - d_p)mG_x$$

When these are divided by the load,

[Formula 37]

$$\frac{X_{Df}}{\mu W_f} = \frac{\frac{l_r}{2l}\left(1-\frac{h}{l_rg}G_x\right)(1+d_p)mG_x}{\mu \frac{ml_rg}{2l}\left(1-\frac{h}{l_rg}G_x\right)} = \frac{G_x}{\mu g}(1+d_p) \quad (37)$$

$$\frac{X_{Dr}}{\mu W_r} = \frac{\frac{l_f}{2l}\left(1+\frac{h}{l_fg}G_x\right)mG_x - \frac{1}{2}d_p mG_x}{\mu \frac{ml_fg}{2l}\left(1+\frac{h}{l_fg}G_x\right)} = \frac{G_x}{\mu g}(1-d_p)$$

Regarding the formulas (22) and (23) indicative of changes in cornering stiffness due to the longitudinal load movement accompanied with the acceleration and deceleration, as illustrated in the formula (28), assuming that the rate of decrease of cornering force by the driving force (or braking force) is the same in any side slip angle, the following formula holds.

[Formula 38]

$$K_{fDR} = K_{f0}\left(1-\frac{h}{l_rg}G_x\right)\sqrt{1-\left(\frac{X_{Df}}{\mu W_f}\right)^2} = \quad (38)$$

$$K_{f0}\left(1-\frac{h}{l_rg}G_x\right)\sqrt{1-\left(\frac{G}{\mu g}(1+d_p)\right)^2} \approx$$

$$K_{f0}\left(1-\frac{h}{l_rg}G_x\right)\left(1-\frac{1}{2}\left(\frac{(1+d_p)}{\mu g}\right)^2 G_x^2\right) \approx$$

$$K_{f0}\left(1-\frac{h}{l_rg}G_x\right)\left(1-\frac{1}{2(\mu g)^2}(1+2d_p)G_x^2\right)$$

[Formula 39]

$$K_{rDR} = K_{r0}\left(1+\frac{h}{l_fg}G_x\right)\sqrt{1-\left(\frac{X_{Dr}}{\mu W_r}\right)^2} = \quad (39)$$

$$K_{r0}\left(1-\frac{h}{l_fg}G_x\right)\sqrt{1-\left(\frac{G}{\mu g}(1-d_p)\right)^2} \approx$$

$$K_{r0}\left(1+\frac{h}{l_fg}G_x\right)\left(1-\frac{1}{2}\left(\frac{(1-d_p)}{\mu g}\right)^2 G_x^2\right) \approx$$

$$K_{r0}\left(1+\frac{h}{l_fg}G_x\right)\left(1-\frac{1}{2(\mu g)^2}(1-2d_p)G_x^2\right)$$

Here, if the values in parentheses are considered to be minute amounts of the same order,

[Formula 40]

$$K_{fDR} = K_{f0}\left(1-\frac{h}{l_rg}G_x - \frac{1}{2(\mu g)^2}(1+2d_p)G_x^2\right) \quad (40)$$

[Formula 41]

$$K_{rDR} = K_{r0}\left(1+\frac{h}{l_fg}G_x - \frac{1}{2(\mu g)^2}(1-2d_p)G_x^2\right) \quad (41)$$

From these, when the instantaneous static margin I.S.M.$_{DR}$ is obtained,

[Formula 42]

$$I.S.M._{DR} = -\frac{1}{l}\frac{l_f K_{fDR} - l_r K_{rDR}}{K_{fDR} + K_{rDR}} \quad (42)$$

$$= -\frac{1}{l}\frac{(l_f K_{f0} - l_r K_{r0})\left\{1-\frac{1}{2}\left(\frac{1}{\mu g}\right)^2 G_x^2\right\} - \frac{h}{l_f l_r g}(l_f^2 K_{f0} + l_r^2 K_{r0})G_x - (l_f K_{f0} + l_r K_{r0})\left(\frac{1}{\mu g}\right)^2 d_p G_x^2}{(K_{f0} + K_{r0})\left\{1-\frac{1}{2}\left(\frac{1}{\mu g}\right)^2 G_x^2\right\} - \frac{h}{l_f l_r g}(l_f K_{f0} - l_r K_{r0})G_x - (K_{f0} - K_{r0})\left(\frac{1}{\mu g}\right)^2 d_p G_x^2}$$

$$= -\frac{1}{l}\frac{(l_f K_{f0} - l_r K_{r0})(1 - E \cdot G_x^2) - F \cdot G_x - H \cdot d_p G_x^2}{(K_{f0} + K_{r0})(1 - E \cdot G_x^2) + G \cdot G_x + I \cdot d_p G_x^2}$$

$$\approx -\frac{1}{l}\frac{(l_f K_{f0} - l_r K_{r0})}{(K_{f0} + K_{r0})} + F'G_x + D_p G_x^2 \approx S.M. + KG_x + D_F G_x^2$$

However,

[Formula 43]

$$\left\{\begin{array}{l} E = \frac{1}{2}\left(\frac{1}{\mu g}\right)^2 > 0, F = \frac{h}{l_f l_r g}(l_f^2 K_{f0} + l_r^2 K_{r0}), \\ G = \frac{h}{l_f l_r g}(l_f K_{f0} - l_r K_{r0}) > 0, \\ H = (l_f K_{f0} + l_r K_{r0})\left(\frac{1}{\mu g}\right)^2 > 0, I = -(K_{f0} - K_{r0})\left(\frac{1}{\mu g}\right)^2 > 0 \end{array}\right. \quad (43)$$

The final deformation of the formula (42) has validity of $(Gx/\mu g)2 \ll 1$, $l_f K_f - l_r K_r \approx 0$, $K_f \approx K_r$ to drop branches and leaves to see the trunk, but a rather bold assumption is made. For the sake of simplicity, the current term expansion does not include terms for which the instantaneous static margin increases according to the yaw angular acceleration ($\approx$equivalent to jerk) due to the nonlinearity of the cornering force as described above, but this is considered to be included in S.M.0, and the influence of the formula (16) is substituted to the formula (42). Furthermore, if acceleration and deceleration control of GVC is applied to $G_x$, the following formula is obtained:

[Formula 44]

$$\begin{aligned} I.S.M._{DR} &= S.M._0 \frac{\{2\mu g + D \cdot C^* \cdot \dot{G}_y\}}{\{2\mu g - C \cdot C^* \cdot \dot{G}_y\}} + KG_x + D_p G_x^2 \\ &= S.M._0 \frac{\{2\mu g + D \cdot C^* \cdot \dot{G}_y\}}{\{2\mu g - C \cdot C^* \cdot \dot{G}_y\}} - K \cdot \text{sgn}(G_y \cdot \dot{G}_y) \frac{C_{xy}}{1+Ts}|\dot{G}_y| + \\ &\quad D_p\left(\text{sgn}(G_y \cdot \dot{G}_y) \frac{C_{xy}}{1+Ts}|\dot{G}_y|\right)^2 \\ &= S.M._0 \frac{\{2\mu g + D \cdot C^* \cdot \dot{G}_y\}}{\{2\mu g - C \cdot C^* \cdot \dot{G}_y\}} - K \cdot \text{sgn}(G_y \cdot \dot{G}_y) \frac{C_{xy}}{1+Ts}|\dot{G}_y| + \\ &\quad D_p\left(\frac{C_{xy}}{1+Ts}|\dot{G}_y|\right)^2 \end{aligned} \quad (44)$$

The second term of the formula (44) indicates that deceleration according to the lateral jerk can mitigate an increase in the instantaneous static margin I.S.M. that increases (becomes understeer) according to the lateral jerk. However, in the third term, the deceleration is squared and the concept of signs disappears. Therefore, the following control rule (Distribution Plus: D+) is introduced to allow the front-rear distribution offset $D_p$ (H·$d_p$) to have the same code characteristics as the second term.

[Formula 45]

$$D_p = -\text{sgn}(G_y \cdot \dot{G}_y) \frac{C_{dp}}{1+Ts}|\dot{G}_y| \quad (45)$$

Figure 7:
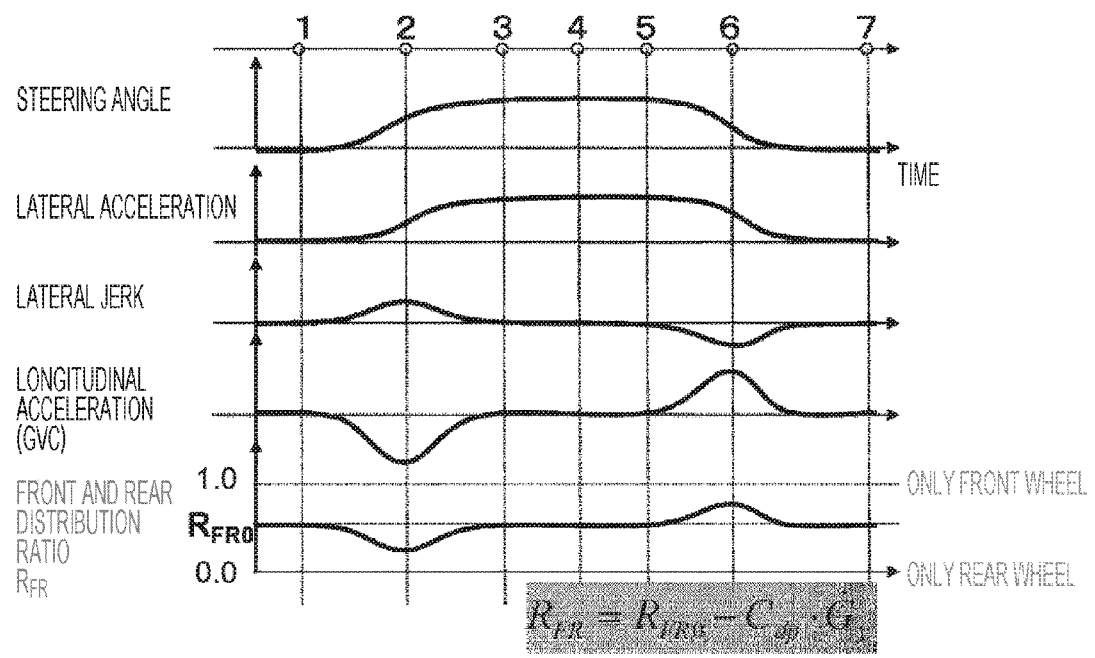
FIG. 7 is a diagram illustrating an aspect in which the front-rear distribution ratio changes by D+ control.

When illustrating the manner of change in distribution ratio by D+ in the same way as the case of FIG. 1, FIG. 7 is obtained. In the situation in which the driver starts steering (1 to 3 in FIG. 7, the same as in FIG. 1), Dp becomes negative, and the front-rear distribution ratio $R_{FR}$ of the deceleration force for generating the deceleration by the GVC becomes close to the rear wheel initial set value $R_{FR0}$, and it is possible to improve the maneuverability and reduce the necessary steering angle by making the U.S. relatively weak. Conversely, when steering is returned to the straight state (5 to 7 in FIG. 7, the same as in FIG. 1), Dp becomes positive, the front-rear distribution ratio $R_{FR}$ of the driving force for generating the acceleration by the GVC becomes close to the front wheel, and the stability improves when the U.S. becomes relatively stronger. When substituting this into the formula (44), the following formula is obtained:

[Formula 46]

$$\begin{aligned} I.S.M._{DR} &= S.M._0 \frac{\{2\mu g + D \cdot C^* \cdot \dot{G}_y\}}{\{2\mu g - C \cdot C^* \cdot \dot{G}_y\}} - \\ &\quad \text{sgn}(G_y \cdot \dot{G}_y) \frac{C_{xy}}{1+Ts}|\dot{G}_y|\left\{K + C_{dp} \cdot C_{xy}\left(\frac{|\dot{G}_y|}{1+Ts}\right)^2\right\} \end{aligned} \quad (46)$$

It is possible to expect that the compensation effect of the instantaneous static margin is greater than that of the load proportional front-rear distribution described earlier and further improvement of maneuverability and stability is achieved.

Considering the final front-rear distribution ratio $R_{FR}$ adopting the D+ control, the initial value can be expressed as $R_{FR0}$ by the following formula.

[Formula 47]

$$R_{FR} = R_{FR0} + D_p = R_{FR0} - \text{sgn}(G_y \cdot \dot{G}_y) \frac{C_{dp}}{1+Ts}|\dot{G}_y| \quad (47)$$

<Evaluation of D+ Control by Full Vehicle Simulation>

Figure 8:
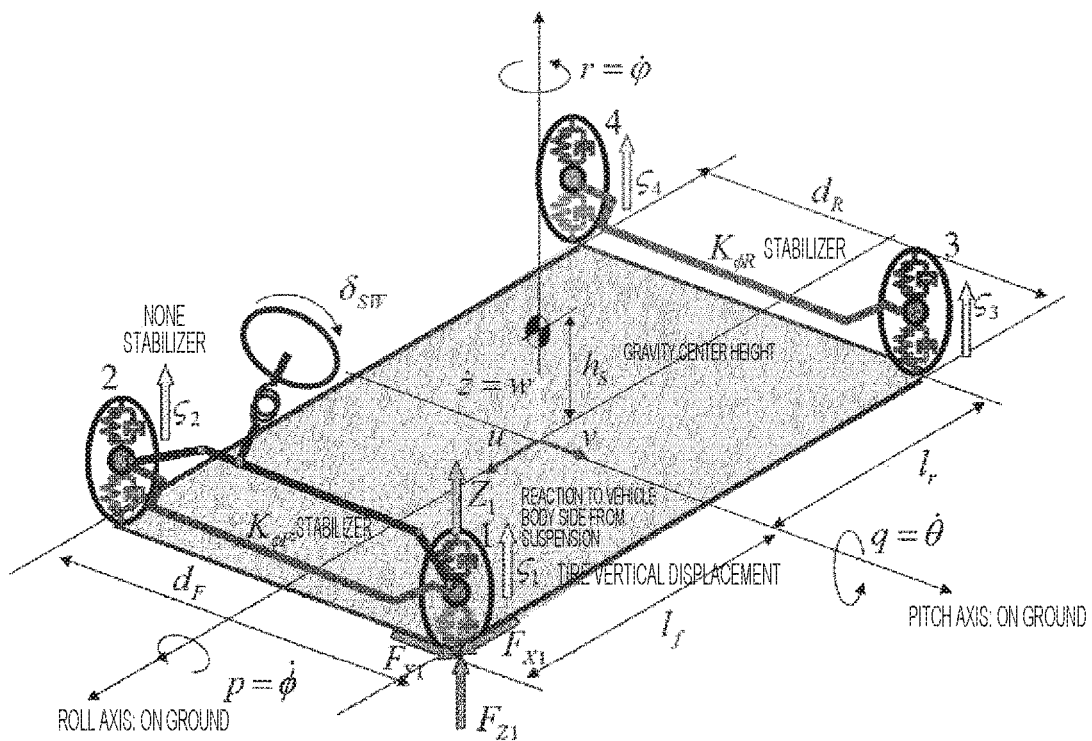
FIG. 8 is a diagram illustrating an outline of a full vehicle simulation for effect confirmation.

Based on the analytical consideration so far, the D+ control formulated by the formula (45) will be considered using a full-vehicle model of 11 degrees of freedom. FIG. 8 is a diagram illustrating the degree of freedom and outline of the full-vehicle model. In the full-vehicle model of 11 degrees of freedom, it is possible to not only calculate the yaw motion but also roll motion and pitch motion. The tire model adopts the brush model. This makes it possible to analytically calculate the influences of 1) nonlinearity of the tire cornering force, 2) load dependence, 3) braking force or driving force for each calculation step. As for steering, "fixed steer" model in which steering angle input was determined in advance was used. By simulating the entry into left corner, three cases were evaluated where (1) there is no control, (2) GVC acceleration and deceleration is achieved by braking force/driving force of front and rear fixed distribution, (3) GVC is achieved by braking force/driving force on which the front-rear distribution by D+ control is controlled. For (2), the braking force and the driving force for achieving the GVC command are fixed to 0.6 (front: 0.6, rear: 1−0.6=0.4) of the front-rear load ratio, and for (3), the distribution ratio was determined by adding the front and rear offsets obtained in the formula (45) to 0.6. The jerk gain $C_{dp}$ was calculated as 1.0. The table illustrated in the lower part of FIG. 8 is a list of various parameters.

The instantaneous static margin (I.S.M.) was evaluated using the instantaneous equivalent cornering stiffness calculated as an internal variable of the tire model. Examination is made whether improvement trends as illustrated in FIG. 4 can be seen.

Figure 9:
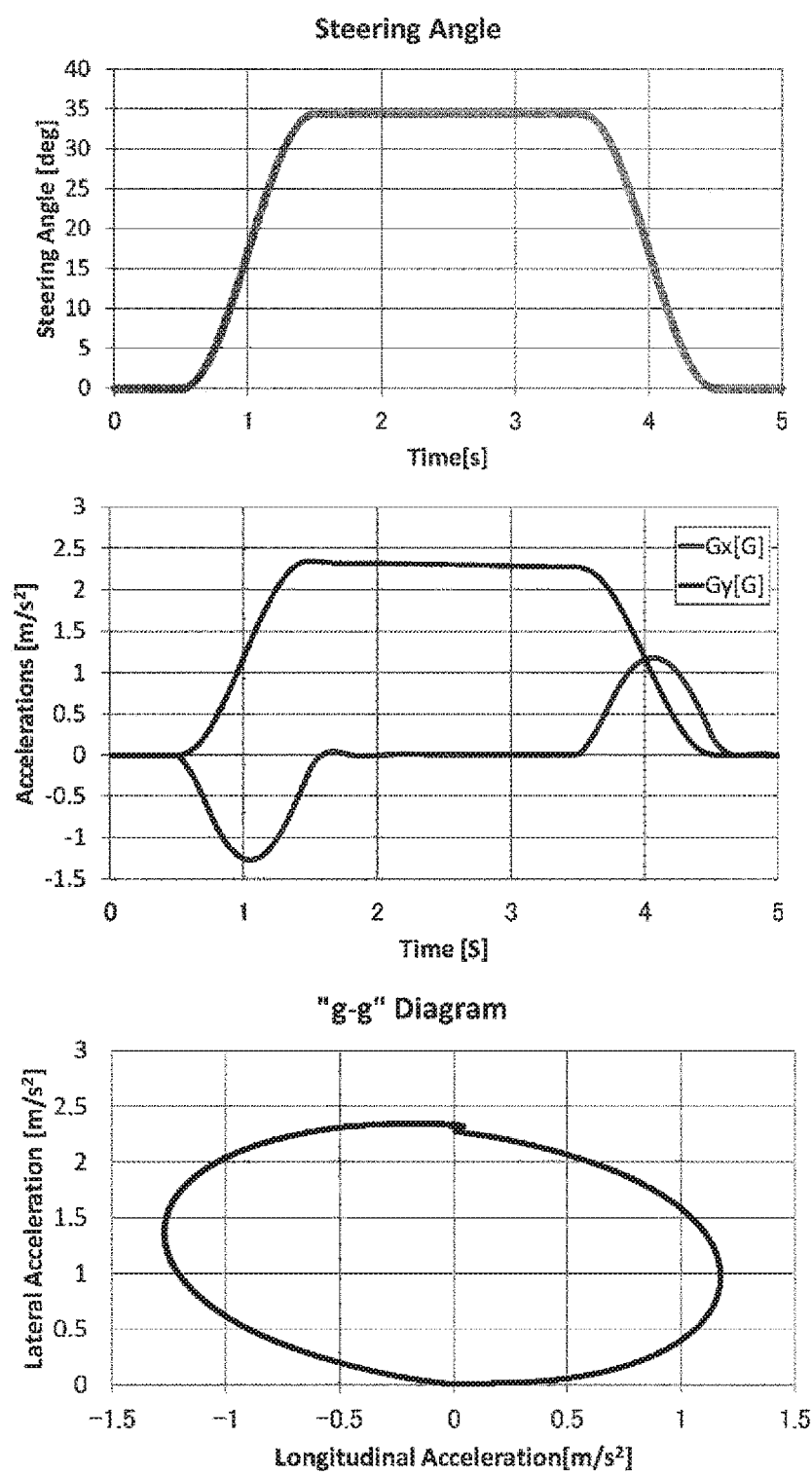
FIG. 9 is a diagram illustrating a steering angle input, a longitudinal acceleration, and a lateral acceleration, and a "g-g" diagram of a full vehicle simulation.
Figure 10:
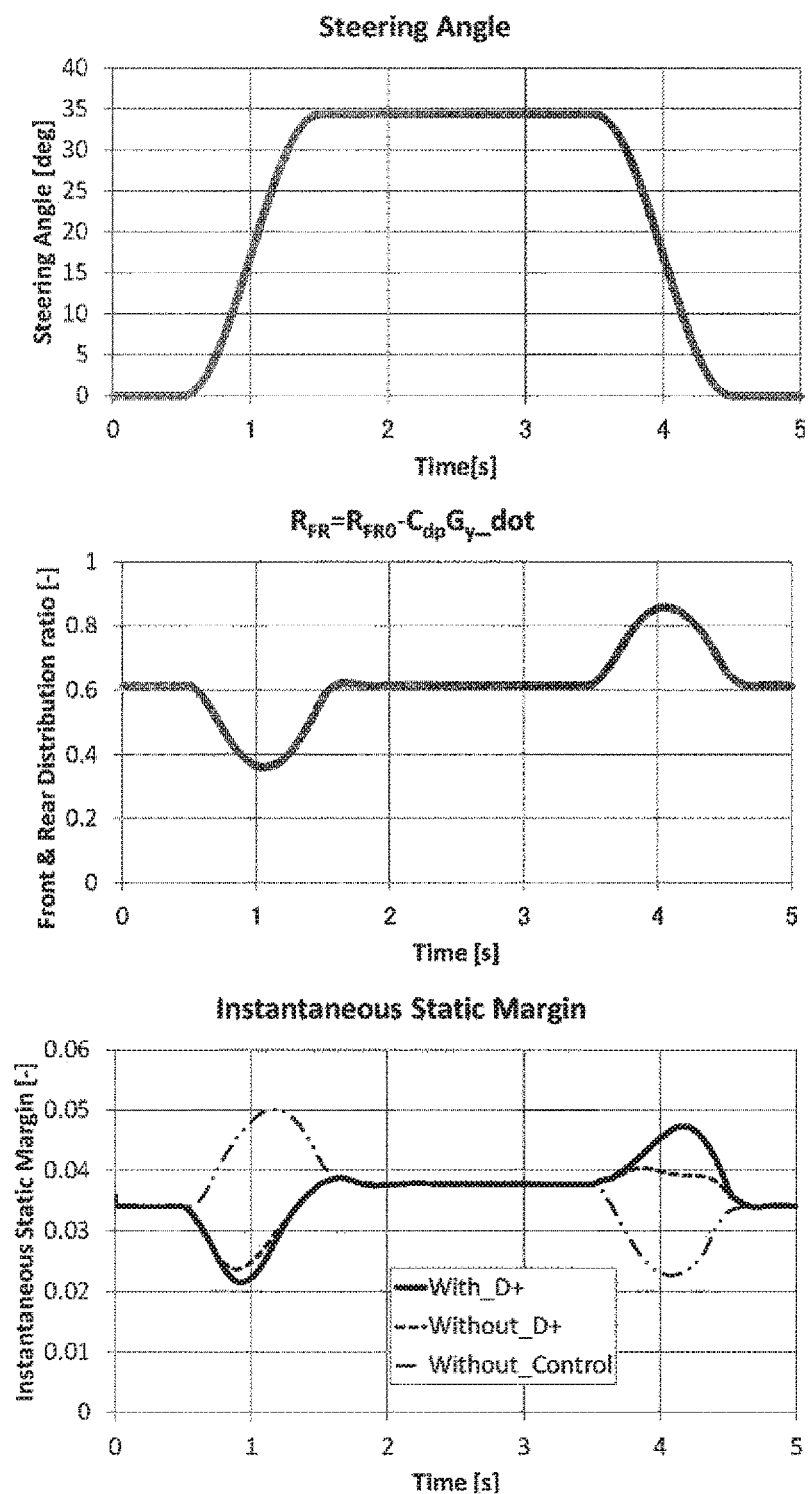
FIG. 10 is a diagram illustrating a steering angle input of a full vehicle simulation, a front-rear distribution ratio of the present invention, and an instantaneous static margin.

FIGS. 9 and 10 are simulation results. The upper part of FIG. 9 is the steering angle. Steering starts from 0.5 seconds to 35 degrees and settles at 35 degrees at 1.5 seconds. As it is, the steering is maintained until 3.5 seconds, the turning is continued, and thereafter, the steering angle is returned to zero at 4.5 seconds. It shows just the same steering state as in FIGS. 1 and 2.

The middle part of FIG. 9 is a time series calculation result of the lateral acceleration $G_y$ and the longitudinal acceleration $G_x$, and the lower part is a so-called "g-g" diagram illustrating a Lissajous waveform of the longitudinal acceleration $G_x$ and the lateral acceleration $G_y$. The lateral jerk $G_{y\_dot}$ is generated by steering from 0.5 seconds to 1.5 seconds at the start of steering. Therefore, the GVC is activated based on the formula (1) (the control command is not zero). Since the lateral acceleration $G_y$ is substantially constant (lateral jerk is zero) from 1.5 seconds to 3.5 seconds when the steering is stopped, the longitudinal acceleration $G_x$ of the GVC does not occur. Since the lateral acceleration $G_y$ decreases from 3.5 seconds to 4.5 seconds, that is, the negative lateral jerk occurs, the GVC becomes an acceleration command. In the aforementioned process, the resultant acceleration vector of the lateral acceleration $G_y$ and the longitudinal acceleration $G_x$ is vectorized in a smooth curved line as illustrated in the "g-g" diagram of the lower part. Therefore, as illustrated above, the front wheel load increases due to deceleration at the start of turning, and the load of the rear wheel increases due to acceleration at the time of escaping.

Now, the upper part of FIG. 10 is a graph illustrating the steering angle again, and the middle part is a graph illustrating the front and rear distribution by D+. Similarly to the GVC in FIG. 9, when the lateral jerk $G_{y\_dot}$ occurs, the distribution offset of the front and rear wheels are calculated based on the formula (45). In this calculation example, the initial front wheel distribution setting is 0.6 (rear wheel: 0.4). Between 0.5 seconds and 1.5 seconds at the start of steering, in order to generate deceleration by GVC, it is necessary to cover the deceleration force with the front and rear wheels. In this period, since the positive lateral jerk occurs, the offset amount becomes negative according to the formula (45), and the distribution of the front wheels becomes smaller than 0.6. This indicates that the distribution of the braking force of the front wheels moves to the rear wheels, and more braking force is borne by the rear wheels.

Also, since the lateral acceleration $G_y$ is substantially constant (the lateral jerk $G_{y\_dot}$ is zero) from 1.5 seconds to 3.5 seconds when the steering is stopped, the offset amount also becomes zero and the initial front wheel distribution setting returns to 0.6. Since the lateral acceleration $G_y$ decreases from 3.5 seconds to 4.5 seconds, that is, the negative lateral jerk occurs, the offset amount becomes positive according to the formula (45). Then, among the driving forces for achieving the acceleration command of the GVC, the proportion borne by the front wheels increases.

By the way, the lower part of FIG. 10 illustrates the aforementioned instantaneous static margin (I.S.M.) for three cases where (1) there is no control (Without_Control), (2) GVC acceleration and deceleration is achieved by braking force/driving force of front and rear fixed distribution (Without_D+), and (3) GVC is achieved with the braking force/driving force controlled by front and rear distribution by D+ control (With_D+).

In (1), by 1) the nonlinearity of the cornering force of the tire, I.S.M. increases simultaneously with the start of steering, that is, the U.S. increases, and at the end of the steering, the I.S.M. decreases, that is, shifts to the OS direction. It is difficult to bend I.S.M. when starting to cut the handle, and I.S.M. wanders when returning, for example. As a result, it is found that both the maneuverability and the stability are deteriorated.

In contrast, with GVC in (2) alone, due to 2) the load dependence of the cornering force, load transfer due to deceleration occurs, the U.S. at the time of entering the corner decreases, and the maneuverability is improved. On the other hand, when escaping, the load moves to the rear wheels due to acceleration based on GVC, but because of the burden of acceleration forces at the rear wheels, under 3) the influence of braking force or driving force, it is limited to slight shift (improvement of stability) to the U.S. direction.

In (3) to which the present invention is applied, as compared with (2) of GVC alone, the effect of reducing the U.S. at the start of turning and the effect of stopping the change in the O.S. direction at the time of turning escape is greatly improved. As a result, it is shown that the D+ control according to the formula (45) disclosed in the present invention appropriately distributes the driving force/braking force to the front wheels and the rear wheels, so that the steering characteristic is preferable, and both the maneuverability and stability can be improved.

<Extension by Abstraction of D+ Control>

Although there is a D+ control showing the basic concept in the formula (45), from the knowledge that U.S. of the vehicle becomes stronger when the yaw angular acceleration increases as illustrated in the formula (16), it is also possible to apply amount other than the lateral jerk as an amount of information. First, when using the yaw angular acceleration,

[Formula 48]

$$D_{pr} = -\text{sgn}(r \cdot \dot{r})\frac{C_{dpr}}{1 + T_r s}|\dot{r}| \Rightarrow R_{FR} = \qquad (48)$$
$$R_{FR0} + D_{pr} = R_{FR0} - \text{sgn}(r \cdot \dot{r})\frac{C_{dpr}}{1 + T_r s}|\dot{r}|$$

The same effect can be obtained. However, r is the yaw rate of the vehicle, and r_dot is the yaw angular acceleration of the vehicle. Furthermore, since the yaw angular acceleration does not require counter steer and the like and has a direct relation with the steering angular velocity in the normal operation region, δ is a steering angle, δ_dot is a steering angular velocity,

[Formula 49]

$$D_{p\delta} = -\text{sgn}(\delta \cdot \dot{\delta})\frac{C_{dpr}}{1 + T_r s}|\dot{\delta}| \Rightarrow R_{FR} = \qquad (49)$$
$$R_{FR0} + D_{p\delta} = R_{FR0} - \text{sgn}(\delta \cdot \dot{\delta})\frac{C_{dp\delta}}{1 + T_r s}|\dot{\delta}|$$

Formulation is also considered, and all the methods are within the scope of the present invention.

Now, the present invention formulated as above is defined by sentences as follows.

For the formula (45), changes are made so that, when the lateral jerk $G_{y\_dot}$ is zero, the distribution ratio of the front wheels is defined as the initial ratio, when the lateral jerk $G_{y\_dot}$ is positive, the distribution ratio of the front wheels is made to be smaller than the initial ratio, and when the lateral jerk $G_{y\_dot}$ is negative, the distribution ratio of the front wheels made to be larger than the initial ratio.

In other words, changes are made so that, when the lateral jerk $G_{y\,dot}$ is zero, the distribution ratio of the rear wheels is defined as the initial ratio, when the lateral jerk $G_{y\,dot}$ is positive, the distribution ratio of the rear wheels is made to be larger than the initial ratio, and when the lateral jerk $G_{y\,dot}$ is negative, the distribution ratio of the rear wheels is made be smaller than the initial ratio.

Stated another way, changes are made so that, when the absolute value of the lateral acceleration increases, the distribution ratio of the front wheels decreases and the distribution ratio of the rear wheels increases, and when the absolute value of the lateral acceleration decreases, the distribution ratio of the front wheels increases and the distribution ratio of the rear wheels decreases.

The formula (48) is the same as in the case of the formula (47). Changes are made so that, when the absolute value of the yaw rate increases, the distribution ratio of the front wheels decreases and the distribution ratio of the rear wheels increases, and when the absolute value of the yaw rate decreases, the distribution ratio of the front wheels increases and the distribution ratio of the rear wheels decreases.

The formula (49) is the same as in the case of the formula (47). Changes are made so that, when the absolute value of the steering angle increases, the distribution ratio of the front wheels decreases and the distribution ratio of the rear wheels increases, and when the absolute value of the steering angle decreases, the distribution ratio of the front wheels increases and the distribution ratio of the rear wheels decreases.

Now, the control method for making the steering characteristic favorable and improving both the maneuverability and the stability by appropriately distributing the driving force/braking force to the front wheels and the rear wheels has been described. Hereinafter, the configuration of a control device and a vehicle using the control method will be described.

Figure 11:
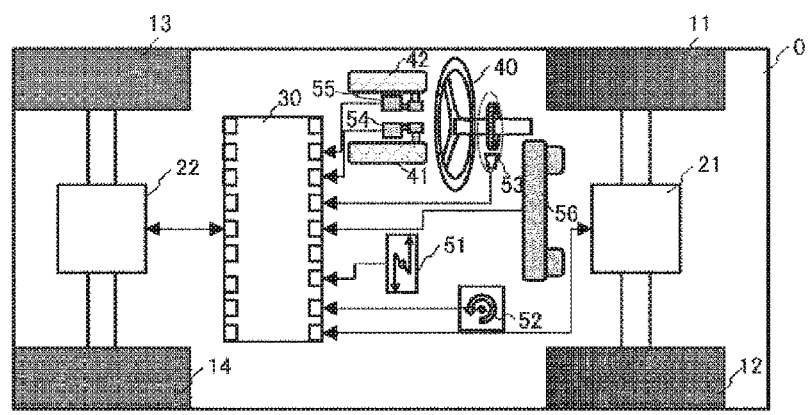
FIG. 11 is a diagram illustrating an overall configuration of an embodiment of the present invention.

FIG. 11 illustrates the overall configuration of a first embodiment of a vehicle using the vehicle motion control device of the present invention. In the present embodiment, the vehicle 0 is a two-motor front-rear arrangement EV/HEV four-wheel drive vehicle which drives a left front wheel 11 and a right front wheel 12 by a front motor 21, and drives a left rear wheel 13 and a right rear wheel 14 by a rear motor 22 (further, in FIG. 11, descriptions of battery components such as batteries are not provided).

The steering amount of a steering wheel 40 of the driver is detected by a steering angle sensor 53, and arithmetic processing such as calculation of the steering angular velocity is performed by an advanced driver assistance system (ADAS) controller 30. The depression amount of an accelerator pedal 41 of the driver is detected by an accelerator sensor 54, and is calculated by an ADAS controller 30. The depression amount of a brake pedal 42 of the driver is detected by a brake sensor 55, and is calculated by the ADAS controller 30. The ADAS controller 30 performs power control and torque control using an inverter (not illustrated) or the like with respect to the front motor 21 and the rear motor 22 according to these amounts. Based on the speed increase (acceleration) and speed reduction (deceleration) commands that are output from the ADAS controller 30, the power driving and regenerative braking can be performed. For example, it is possible to generate a decelerating action based on longitudinal motion commands such as deceleration obtained by GVC, target speed command and the like.

Next, the sensor group of the present invention will be described.

Figure 12:
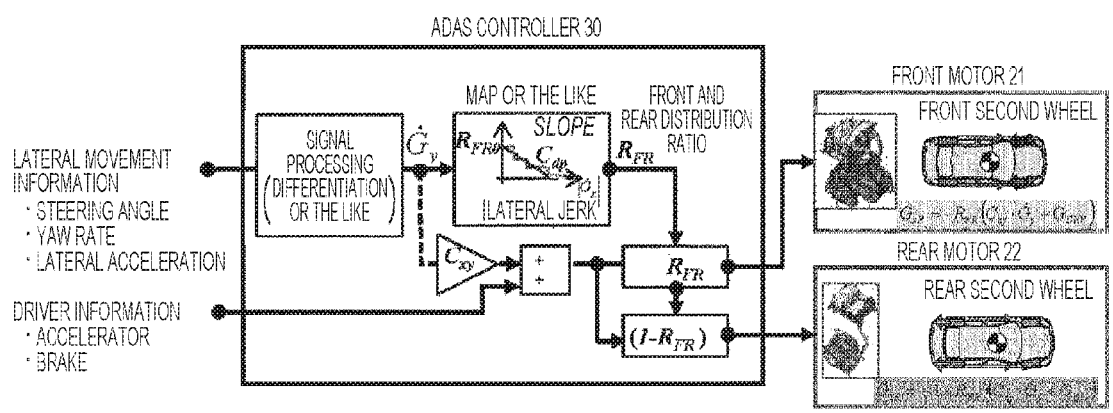
FIG. 12 is a diagram illustrating the relation between controller internal processing and front and rear motors of the present invention.

As illustrated in FIG. 11, a lateral acceleration sensor 51 and a yaw rate sensor 52 are disposed near the center of gravity point. A logic for obtaining lateral jerk information by differentiating the output of the lateral acceleration sensor 51 and a logic for obtaining yaw angular acceleration by differentiating the output of the yaw rate sensor 52 are equipped in the ADAS controller 30 as illustrated in FIG. 12.

Also, as illustrated in Japanese Patent Application Laid-Open No. 2011-7353, an estimated yaw rate using the vehicle speed, the steering angle and the vehicle motion model, and a lateral jerk or a yaw angular acceleration using lateral acceleration may be obtained, and for example, they may be used in combination by processing such as select/high.

Furthermore, a stereo camera 56 is mounted on the vehicle 0. The stereo camera 56 is made up of CCD cameras which are two image pickup elements in the horizontal direction.

The two CCD cameras are disposed, for example, in the form of interposing a room mirror (not illustrated) in the passenger compartment, individually pick up an object in front of the vehicle from different coordinates of the vehicle fixed system, and output two pieces of image information to a stereo image processing device (mounted in the stereo camera 56). Although a CCD camera is used here, a CMOS camera may be used.

Image information is input to the stereo image processing device from the stereo camera 56 and the vehicle speed V is input to the stereo image processing device via the ADAS controller 30. Based on these pieces of information, the stereo image processing device recognizes front information such as three-dimensional object data or white line data ahead of the vehicle 0 based on the image information from the stereo camera 56, and estimates the traveling path of the vehicle. In the present embodiment, the ADAS controller 30 is configured to perform the GVC and D+ control to control the front motor 21 and the rear motor 22. However, since both control logics are extremely small in calculation amount, the controller may be mounted on the stereo image processing device in the stereo camera 56. As a result, in order to construct a collision damage mitigation brake system, it is possible to share a controller with a stereo camera or the like already installed in the vehicle, which leads to cost reduction.

FIG. 12 illustrates a signal transmission configuration of the ADAS controller 30, the front motor 21, and the rear motor 22 of the present invention.

Vehicle lateral motion information such as a steering angle, a yaw rate and a lateral acceleration, and driver information such as accelerator and brake are input to the ADAS controller 30. Signal processing such as differentiation is performed on the lateral motion information, respectively, thereby obtaining the steering angular velocity, the yaw angular velocity, and the lateral jerk (in FIG. 12, represented by lateral jerk as a physical quantity). The lateral jerk is multiplied by the gain $C_{xy}$ in the same way as in the formula (1) to calculate the GVC acceleration and deceleration command value. The acceleration command by the accelerator from the driver and the deceleration command by the brake are added thereto to calculate an acceleration and deceleration command. On the other hand, the ADAS controller 30 calculates the distribution offset $D_p$ based on the lateral jerk acceleration, the yaw angular velocity and the steering angular velocity, as illustrated in the formula (45), the formula (48) and the formula (49), and may calculate the front-rear distribution ratio $R_{FR}$ by adding to and subtracting from the initial distribution $R_{FR0}$. Or, the horizontal axis may be stored as a map of the steering angular velocity, the yaw angular velocity, and the lateral jerk as illustrated in FIG. 12. In such a case, the slope of the two-dimensional map becomes $C_{dp}$. Deceleration command is divided into the front-rear distribution ratio $R_{FR}$ to control the regenerative/power running power of the front motor 21 which drives the two front wheels and the rear motor 22 which drives the two rear wheels so as to be close to the acceleration and deceleration command.

Figure 13:
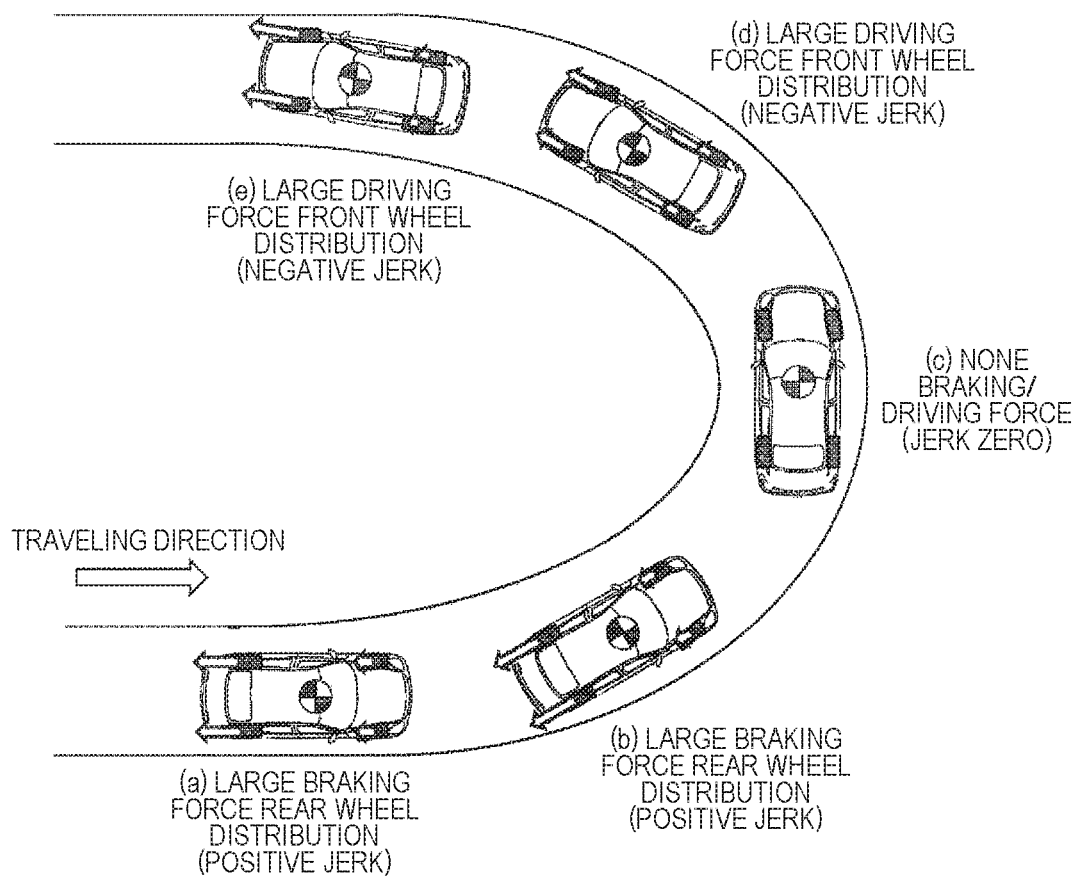
FIG. 13 is a diagram illustrating a cornering scenario and a driving force distribution aspect when the present invention is implemented.

FIG. 13 illustrates an embodiment of the present invention based on a cornering scenario.

When entering the left corner along the traveling direction, positive lateral acceleration rises and jerk also becomes positive. Therefore, the deceleration command by the GVC is generated according to the formula (1). In addition, with the generation of the positive jerk, the $R_{FR}$ becomes smaller based on the formula (45) or the map of the ADAS controller 30, and consequently the braking force distribution to the rear wheels becomes larger (arrow of each wheel braking force of FIGS. 13(a) and 13(b)).

Next, since the jerk becomes zero at the clipping point or at a steady turn, the acceleration and deceleration command also becomes zero and no braking force/driving force is generated (FIG. 13(c)).

Further, when escaping from the left corner, since the positive lateral acceleration decreases, the jerk becomes negative. Therefore, an acceleration command of the GVC is generated according to the formula (1). In accordance with the occurrence of the negative jerk, the $R_{FR}$ becomes larger based on the formula (45) or the map of the ADAS controller 30, and as a result, the driving force distribution to the front wheels becomes large (FIGS. 13(d) and 13(e)).

As described above, according to the present invention, the front-rear driving force and the braking force can be changed so that the braking force of the rear wheels becomes large at the start of turning and the driving force of the front wheels becomes large at the time of escape.

Although the two-motor front-rear arrangement vehicle has been described in the present embodiment, the analysis contents based on the tire characteristics in the first half of the embodiment are not limited thereto, and of course, it is also possible to improve handling performance in a vehicle which has the front-rear torque distribution device, is equipped with a single internal combustion engine or is equipped with a single electric motor. Also, as long as acceleration control is not performed and only deceleration control is specialized, the present invention can also be applied as a front-rear distribution control of a friction brake.

As described above, according to the present invention, the front and rear braking/driving distribution control (D+) achieving both of the improvement of the maneuverability and stability of the vehicle is embodied, and thus it is possible to provide vehicle motion control device and a vehicle equipped with the same (transfer type four-wheel drive, two-motor front-rear arrangement vehicle). Further, considering only the braking side, it is also applicable to a brake device capable of changing the front-rear distribution and a vehicle on which the brake device is mounted. In the present embodiment, although the case where GVC is applied exclusively has been mentioned, as illustrated in FIG. 12, even if the D+ control is performed based on only the driver's accelerator and brake information, that is, based on the acceleration and deceleration request of the driver in the state of GVC gain $C_{xy}=0$, improvement in both of the maneuverability and the stability of the vehicle can be achieved in the premise that the driver performs accurate acceleration and deceleration like an experienced driver.

Figure 14:
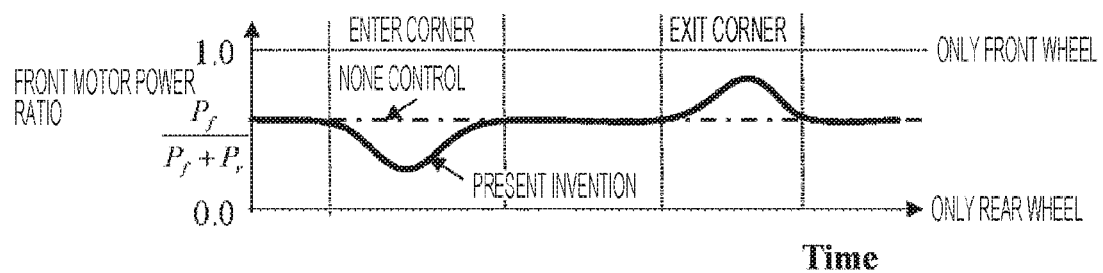
FIG. 14 is a diagram illustrating respective features at the time of implementation of the present invention and at the time of non-implementation of the present invention.
Figure 14:
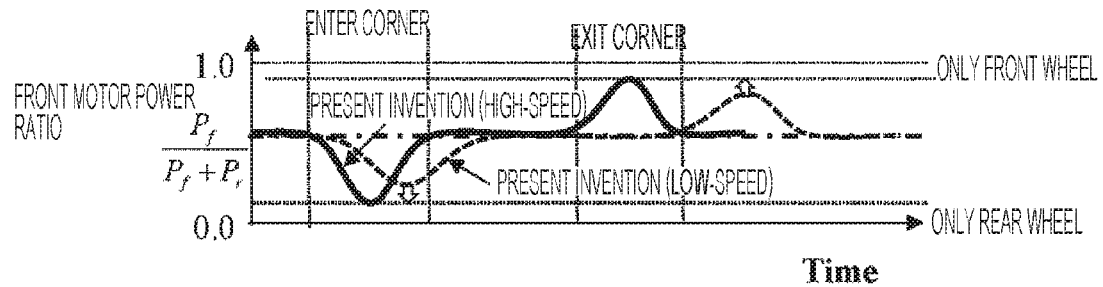

Finally, the characteristics of the vehicle to which the present invention is applied and the characteristics of the vehicle to which the present invention is not applied are described with reference to FIG. 14 (however, description is given for the two-motor front/rear arrangement EV/HEV).

First, it is assumed that the vehicle travels on a course as illustrated in FIG. 1, 2, or 13 under low speed running conditions. The electric powers ($P_f, P_r$) of the front motor 21 and the rear motor 22 are measured and the power ratio ($P_f/(P_f+P_r)$) of the front motor is calculated. In the vehicle to which the present invention is applied, the power ratio of the front motor decreases when entering a corner as compared to before the corner entry. At the time of escaping the corner, the power ratio of the front motor 21 increases.

Next, consideration is made on comparing the power ratio of the front motor when traveling at the same corner at high speed with the power ratio of the front motor when traveling at low speed. In order to follow the same corner at high speed, the steering speed, the yaw angular speed, and the lateral jerk are inevitably larger than those when traveling at low speed. Then, the offset of the power ratio itself increases in accordance with information such as the formulas (45), (48) and (49), or maps. As illustrated in FIG. 14(2), as compared to traveling under the low speed conditions of the present invention, when entering the corner, the power ratio of the front motor decreases, and when escaping the corner, the power ratio of the front motor further increases. This is a feature of the vehicle equipped with the present invention.

Even in the case other than EV/HEV, from the same point of view, in the front and rear brake hydraulic pressure, the transfer clamping force or the wheel 6 component force measurement, the deceleration force generated by the front wheels at the time of entry decreases, and at the time of escape, the driving force generated by the front wheels increases. Thus, it is possible to determine whether there is a vehicle equipped with the present invention.

REFERENCE SIGNS LIST 0 vehicle
11 left front wheel
12 right front wheel
13 left rear wheel
14 right rear wheel
21 front motor
33 rear motor
30 ADAS controller
40 steering
41 accelerator pedal
42 brake pedal
51 lateral acceleration sensor
52 yaw rate sensor
53 steering angle sensor
54 accelerator sensor
55 brake sensor
56 stereo camera

The invention claimed is:
1. A vehicle control method for controlling a driving force or a braking force in a longitudinal direction of a vehicle based on an input value related to a lateral motion of the vehicle, the method comprising:
changing a front/rear wheel distribution ratio for the driving force or the braking force based on the input value, wherein a combined acceleration that includes a longitudinal acceleration and a lateral acceleration of the vehicle is directed to make a curved transition with an elapsed time, at least one control of a first control and a second control is effected, wherein the first control controls a front wheel distribution ratio of the front/rear distribution ratio to be smaller than the front wheel distribution ratio in a case when the input value is zero, when the input value increases, and the second control controls the front wheel distribution ratio to be larger than the front wheel distribution ratio in a case when the input value is zero, when the input value decreases.

2. The vehicle control method according to claim 1, wherein the first control and the second control are effected.

3. The vehicle control method according to claim 2, wherein the input value is an absolute value of a lateral acceleration of the vehicle.

4. The vehicle control method according to claim 3, wherein the front wheel distribution ratio $R_{FR}$ is generated by $$R_{FR} = R_{FR0} - \text{sgn}(G_y \cdot \dot{G}_y) \frac{C_{dp}}{1+Ts} |\dot{G}_y|$$

wherein Gy is a lateral acceleration of the vehicle, Gy_dot is a lateral jerk of the vehicle, Cdp is a lateral jerk gain, T is a first-order delay time constant, s is a Laplace operator, and $R_{FR0}$ is an initial distribution ratio.

5. The vehicle control method according to claim 4, wherein the front wheel distribution ratio $R_{FR}$ is generated by $$R_{FR} = R_{FR0} - \text{sgn}(r \cdot \dot{r}) \frac{C_{dpr}}{1+T_r s} |\dot{r}|$$

wherein r is a vehicle yaw rate, r_dot is a vehicle yaw angular acceleration, Cdpr is a yaw angular acceleration gain, T is a first-order delay time constant, s is a Laplace operator, and $R_{FR0}$ is an initial distribution ratio.

6. The vehicle control method according to claim 2, wherein the input value is an absolute value of a yaw rate of the vehicle.

7. The vehicle control method according to claim 2, wherein the input value is an absolute value of a steering angle.

8. The vehicle control method according to claim 7, wherein the front wheel distribution ratio $R_{FR}$ is generated by $$R_{FR} = R_{FR0} - \text{sgn}(\delta \cdot \dot{\delta}) \frac{C_{dp\delta}}{1+T_r s} |\dot{\delta}|$$

wherein

δ is a steering angle, δ_dot is a steering angular velocity, Cdpδ is a steering angular velocity gain, T is a first-order delay time constant, s is a Laplace operator, and $R_{FR0}$ is an initial distribution ratio.

9. The vehicle control method according to claim 2, wherein the front wheel distribution ratio is controlled using a map in which values of the front wheel distribution ratio corresponding to the input value are stored in advance.

10. The vehicle control method according to claim 2, wherein the front wheel distribution ratio of the braking force is reduced to decrease the braking force and/or the braking torque generated by the front wheels, the front wheel distribution ratio of the braking force is increased to increase the braking force and/or the braking torque generated by the front wheels, the front wheel distribution ratio of the driving force is reduced to decrease the driving force and/or driving torque generated by the front wheels, and the front wheel distribution ratio of the driving force is increased to increase the driving force and/or driving torque generated by the front wheels.

11. The vehicle control system according to claim 10, further comprising a stereo camera, wherein the control device is enclosed in the stereo camera.

12. The vehicle control method according to claim 1, wherein the vehicle is controlled to decelerate when the input value increases, and the vehicle is controlled to accelerate when the input value decreases.

13. The vehicle control method according to claim 12, wherein the acceleration and deceleration control of the vehicle is performed based on a longitudinal acceleration command value, and the longitudinal acceleration command value Gxc is generated by $$G_{xc} = -\text{sgn}(G_y \cdot \dot{G}_y) \frac{C_{xy}}{1+Ts} |\dot{G}_y|$$

wherein Gy is a lateral acceleration of the vehicle, Gy_dot is a lateral jerk of the vehicle, Cxy is a lateral jerk gain, T is a first-order delay time constant, and s is a Laplace operator.

14. The vehicle control method according to claim 12, wherein, in a vehicle fixed coordinate system in which a longitudinal acceleration of the vehicle is set as an x-axis, a lateral acceleration of the vehicle is set as a y-axis, a forward direction of the vehicle is set as positive x-axis, and a steering direction of the vehicle is set as a positive y-axis, when the steering is input to the vehicle or when the vehicle starts to turn in the positive y-direction, the lateral acceleration of the vehicle is generated in the positive direction and the longitudinal acceleration of the vehicle is generated in the negative direction, so that a trajectory of coordinates displaying the longitudinal acceleration and the lateral acceleration is a smooth curve in a clockwise direction from the vicinity of the origin to a II quadrant.

15. A vehicle control system which comprises:

a front motor configured to drive front wheels, a rear motor configured to drive rear wheels, and a control device configured to execute a vehicle control method for controlling a driving force or a braking force in a longitudinal direction of a vehicle based on an input value related to a lateral motion of the vehicle, the method comprising:

changing a front/rear wheel distribution ratio for the driving force or the braking force based on the input value, wherein a combined acceleration that includes a longitudinal acceleration and a lateral acceleration of the vehicle is directed to make a curved transition with an elapsed time, at least one control of a first control and a second control is effected, wherein the first control controls a front/rear wheel distribution ratio of the front/rear distribution ratio to be smaller than the front/rear wheel distribution ratio in a case when the input value is zero, when the input value increases, and the second control controls the front/rear wheel distribution ratio to be larger than the front/rear wheel distribution ratio in a case when the input value is zero, when the input value decreases, wherein the control device is configured to vary the distribution ratio of the front wheels by controlling a supply voltage to the front motor.

16. A vehicle controller for a vehicle for controlling a driving force or a braking force in a longitudinal direction of a vehicle based on an input value related to a lateral motion of the vehicle, the controller comprising:

a processor configured to change a front/rear distribution ratio among the driving force or the braking force based on the input value, and conduct at least one control of following 1st control and following 2nd control, wherein a combined acceleration of a longitudinal acceleration and lateral acceleration of the vehicle is directed to make a curved transition with an elapse of time, wherein the first control controls a front wheel distribution ratio of the front/rear distribution ratio to be smaller than the front wheel distribution ratio in a case when the input value is zero, when the input value increases, and wherein the second control controls the front wheel distribution ratio to be larger than the front wheel distribution ratio in a case when the input value is zero, when the input value decreases.

17. The vehicle controller according to claim 16, wherein the processor conducts the first control and the second control.

18. The vehicle controller according to claim 17, wherein the input value is an absolute value of a lateral acceleration of the vehicle.

19. The vehicle controller according to claim 18, wherein the front/rear wheel distribution ratio RFR is generated by $$R_{FR} = R_{FR0} - \text{sgn}(G_y \cdot \dot{G}_y) \frac{C_{dp}}{1 + Ts} |\dot{G}_y|$$

wherein Gy is a lateral acceleration of the vehicle, Gy_dot is a lateral jerk of the vehicle, Cdp is a lateral jerk gain, T is a first-order delay time constant, s is a Laplace operator, and RFR0 is an initial distribution ratio.

20. The vehicle controller according to claim 19, wherein the front/rear wheel distribution ration $R_{FR}$ is generated by $$R_{FR} = R_{FR0} - \text{sgn}(r \cdot \dot{r}) \frac{C_{dpr}}{1 + T_r s} |\dot{r}|$$

wherein r is a vehicle yaw rate, r_dot is a vehicle yaw angular acceleration, Cdpr is a yaw angular acceleration gain, T is a first-order delay time constant, s is a Laplace operator, and RFR0 is an initial distribution ratio.

21. The vehicle controller according to claim 17, wherein the input value is an absolute value of a yaw rate of the vehicle.

22. The vehicle controller according to claim 17, wherein the input value is an absolute value of a steering angle.

23. The vehicle controller according to claim 22, the front/rear wheel distribution ratio RFR is generated by $$R_{FR} = R_{FR0} - \text{sgn}(\delta \cdot \dot{\delta}) \frac{C_{dp\delta}}{1 + T_r s} |\dot{\delta}|$$

wherein δ is a steering angle, δ_dot is a steering angular velocity, Cdpδ is a steering angular velocity gain, T is a first-order delay time constant, s is a Laplace operator, and RFR0 is an initial distribution ratio.

24. The vehicle controller according to claim 17, wherein the front/rear wheel distribution ratio is controlled using a map in which values of the front/rear wheel distribution ratio corresponding to the input value are stored in advance.

25. The vehicle controller according to claim 17, wherein the front/rear wheel distribution ratio of the braking force is reduced to decrease the braking force and/or the braking torque generated by the front wheels, the front/rear wheel distribution ratio of the braking force is increased to increase the braking force and/or the braking torque generated by the front wheels, the front/rear wheel distribution ratio of the driving force is reduced to decrease the driving force and/or driving torque generated by the front wheels, and the front/rear wheel distribution ratio of the driving force is increased.

26. The vehicle controller according to claim 16, wherein the vehicle is controlled to decelerate when the input value increases, and the vehicle is controlled to accelerate when the input value decreases.

27. The vehicle controller according to claim 26, wherein the acceleration and deceleration control of the vehicle is performed based on a longitudinal acceleration command value, and the longitudinal acceleration command value Gxc is generated by $$G_{xc} = -\text{sgn}(G_y \cdot \dot{G}_y) \frac{C_{xy}}{1 + Ts} |\dot{G}_y|$$

wherein Gy is a lateral acceleration of the vehicle, Gy_dot is a lateral jerk of the vehicle, Cxy is a lateral jerk gain, T is a first-order delay time constant, and s is a Laplace operator.

28. The vehicle controller according to claim 26, wherein, in a vehicle fixed coordinate system in which a longitudinal acceleration of the vehicle is set as an x-axis, a lateral acceleration of the vehicle is set as a y-axis, a forward direction of the vehicle is set as positive x-axis, and a steering direction of the vehicle is set as a positive y-axis, when the steering is input to the vehicle or when the vehicle starts to turn in the positive y-direction, the lateral acceleration of the vehicle is generated in the positive direction and the longitudinal acceleration of the vehicle is generated in the negative direction, so that a trajectory of coordinates displaying the longitudinal acceleration and the lateral acceleration is a smooth curve in a clockwise direction from the vicinity of the origin to a II quadrant.

* * * * *